US005594791A

United States Patent [19]
Szlam et al.

[11] Patent Number: 5,594,791
[45] Date of Patent: Jan. 14, 1997

[54] METHOD AND APPARATUS FOR PROVIDING RESULT-ORIENTED CUSTOMER SERVICE

[75] Inventors: Aleksander Szlam, Norcross; James E. Owen, Smyrna, both of Ga.

[73] Assignee: Inventions, Inc., Norcross, Ga.

[21] Appl. No.: 318,506

[22] Filed: Oct. 5, 1994

[51] Int. Cl.$^6$ .............................. H04M 3/00; H04M 3/42
[52] U.S. Cl. ......................... 379/265; 379/201; 379/216; 379/309; 379/355
[58] Field of Search ................................ 379/91, 92, 93, 379/94, 100, 201, 216, 265, 266, 309, 355

[56] References Cited

U.S. PATENT DOCUMENTS

| | | | |
|---|---|---|---|
| 3,989,899 | 11/1976 | Norwich | 379/92 X |
| 5,185,782 | 2/1993 | Srinivasan | 379/216 X |
| 5,343,518 | 8/1994 | Kneipp | 379/355 |
| 5,436,965 | 7/1995 | Grossman et al. | 379/309 X |

*Primary Examiner*—Jeffery Hofsass
*Assistant Examiner*—Harry S. Hong
*Attorney, Agent, or Firm*—Jones & Askew

[57] ABSTRACT

An automated customer service system which maintains and uses a customer sensitivity profile to contact the customer in a manner, at a time and date, and at a location which are preferred by the customer. This maximizes the likelihood that the customer will be favorably responsive to the contact, whether the contact be to make a sale, to discuss collection of a balance due, or just to obtain current information about the customer. The automated customer service system also maintains and uses a list of available resources, such as an agent qualification profile, in conjunction with the customer sensitivity profile, to automatically assign available resources, such as agents, to the various campaigns. The agent qualification profile identifies any special skills or qualifications that an agent may possess, such as language skills, type of voice, efficiency, and type of call processing skills. The system administrator devises a strategy script based upon the customer sensitivity requirements and the agent qualifications. The strategy script determines which resources, such as agents, meet which requirements, and whether there are adequate resources to handle the requirements of concurrent campaigns. The strategy script also provides for assignment of the resources in accordance with a preplanned priority or procedure in the event that there are not adequate resources available.

25 Claims, 13 Drawing Sheets

Fig — 1

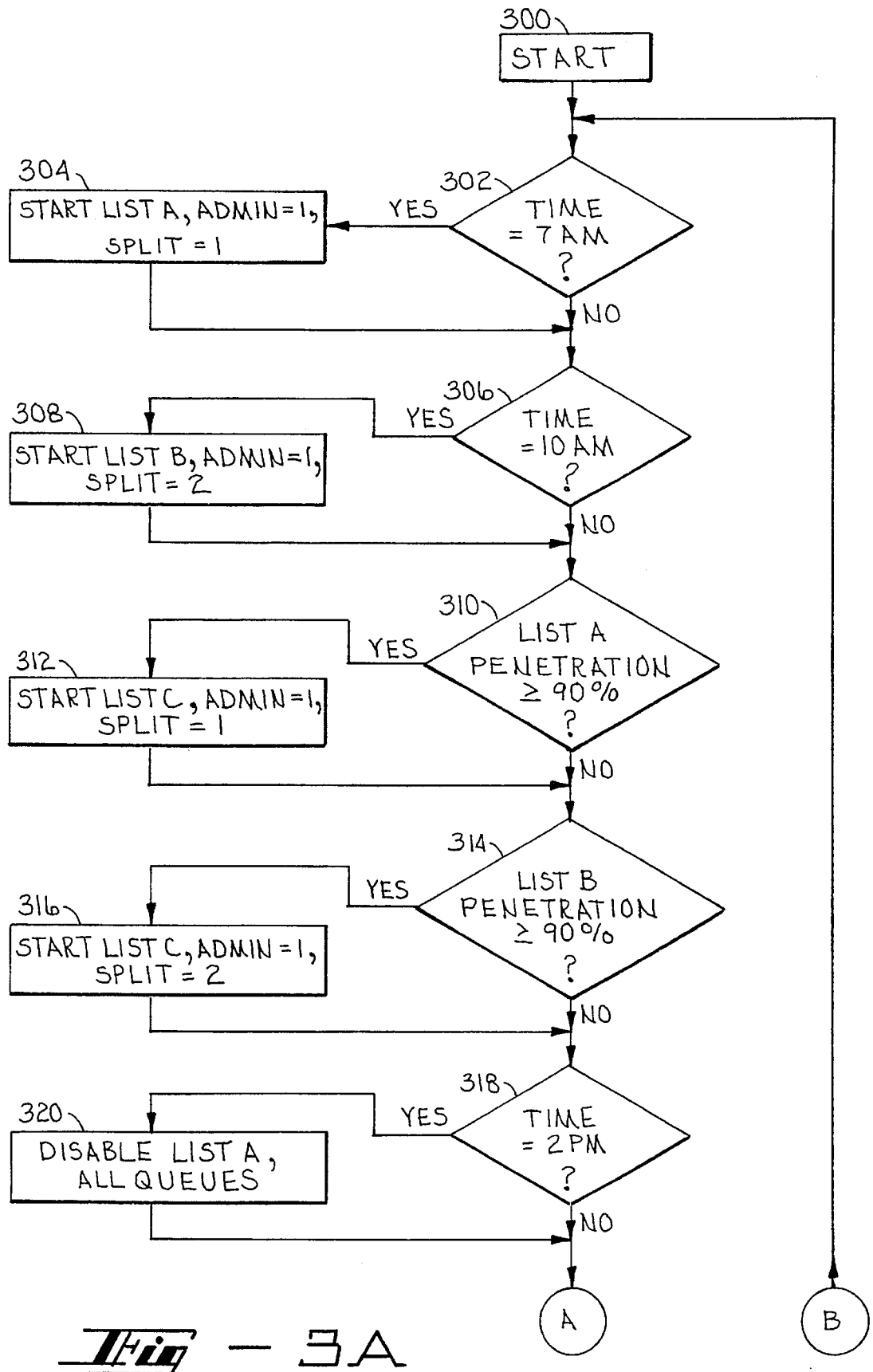
Fig — 3A

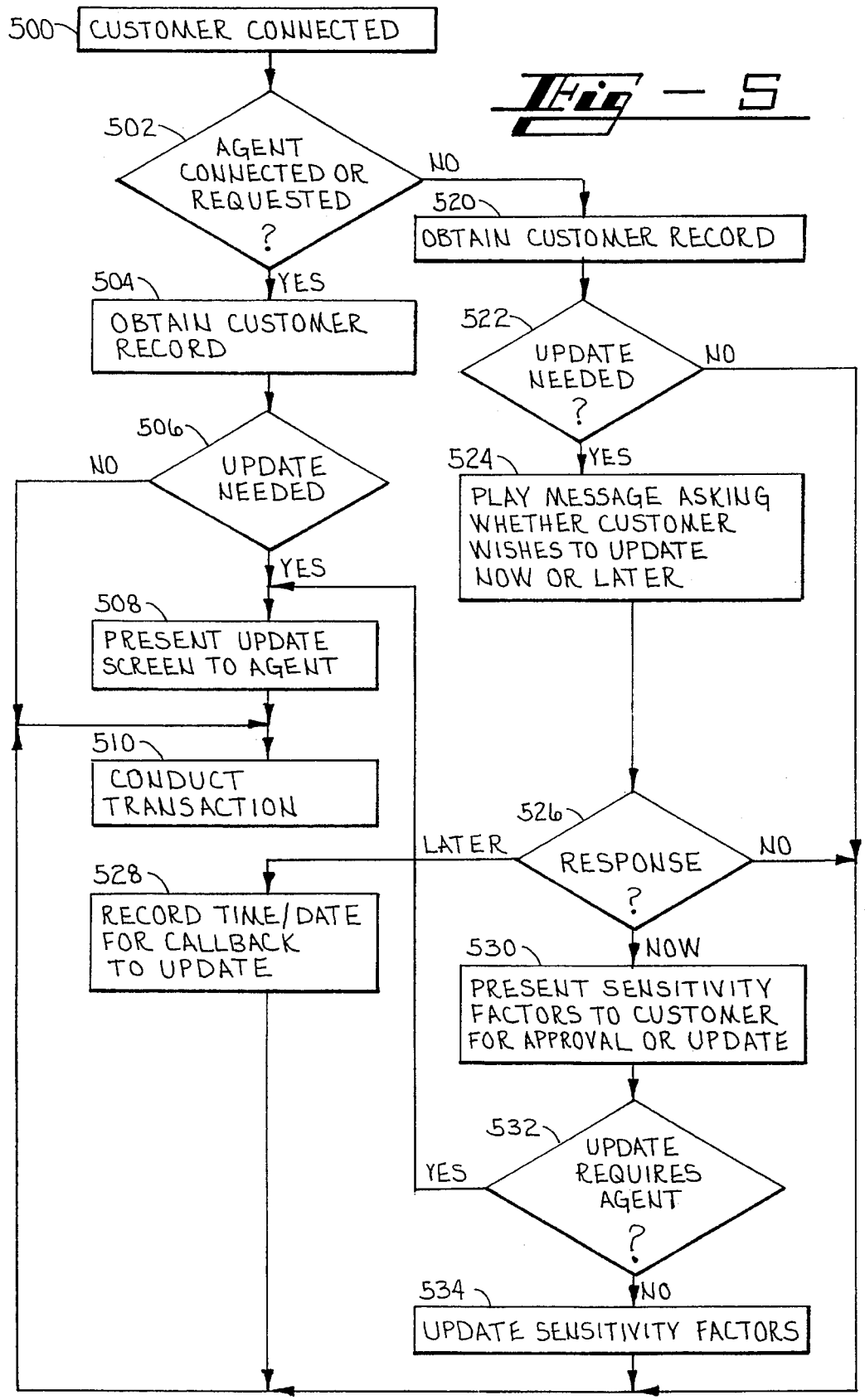

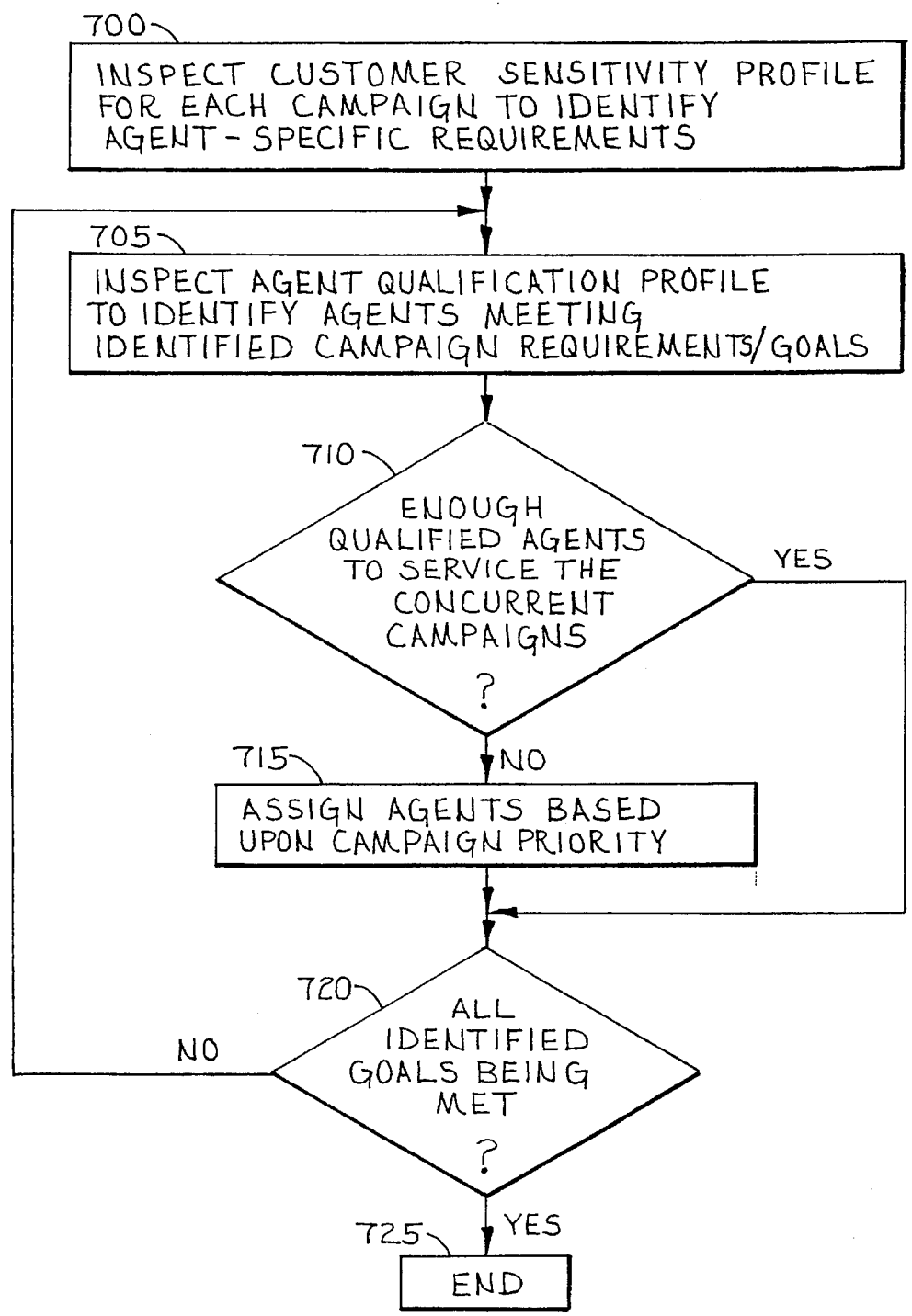

METHOD AND APPARATUS FOR PROVIDING RESULT-ORIENTED CUSTOMER SERVICE

TECHNICAL FIELD

This invention relates to automated customer service systems and, more particularly, is an automated customer service system, which accommodates both inbound and outbound communications, which uses a variety of media, and which has a user-programmable strategy, so as to provide result-oriented customer service.

BACKGROUND OF THE INVENTION

Telemarketing systems, also known as automated dialing systems, have evolved substantially in the past two decades. Some early telemarketing systems consisted of no more than a display terminal connected to a memory, and a telephone. These early systems required the agent to enter a command which recalled from the memory and displayed at the agent's terminal the name and telephone number of the customer to be called. The agent then manually dialed the telephone number and, if the customer answered, the agent discussed the reason for the call or initiated an automated voice message. The script of the reason for the call was originally written on a piece of paper. In later systems, the script was presented on the display screen of the agent terminal.

The next generation of telemarketing systems provided for automated dialing. That is, the agent would enter a command to recall the name and telephone number of the customer from the memory and the telemarketing system would then automatically dial the telephone number. This increased the agent efficiency because the automated dialing process was faster and there were fewer, if any, misdialed numbers. However, the agent was on the telephone line for the entire dialing and ringing process and had to wait until the called party answered. If the called number was busy or did not answer then the agent's time was wasted. Therefore, agent efficiency was still less than desirable.

Other improvements introduced later were call pacing and predictive dialing. With call pacing the telemarketing system would pace the placement of the calls at a rate set by a system administrator. More calls would be placed than there were agents available because some of the calls would be busy or not answered. This provided a higher agent efficiency because the agent did not have to dial a call or wait on a call to be answered by the called party. Instead, the agent simply logged on to the telemarketing system and the system dialed the calls. The system would automatically determine the status of the call, such as no dial tone, no ring, busy, no answer, three-tone intercept, and answered. When a call was answered by the called party, the telemarketing system automatically connected the agent to the called party and displayed the information for the called party on the agent's terminal. As soon as the agent indicated that a particular transaction had been completed the system would connect another called party to the agent. The system administrator could, in some systems, adjust the rate "on the fly" so that if the original call pacing rate was incorrect the call pacing rate could be adjusted to match the campaign "hit rate", that is, the percent of the calls dialed that were actually answered by a human.

However, conditions would often change faster than the system administrator could detect and compensate for. Also, the system administrator frequently had other duties, such as training agents, handling problem calls or customers, typing, sending and reviewing facsimile messages, etc. Therefore, the selected call pacing rate would generally lag the rate required by the current conditions. If the selected call pacing rate was too slow then some agents would be idle; if the selected call pacing rate was too fast then the agents would all be busy but some called parties would have to be placed on hold because all the agents were busy. The first condition was inefficient; the second condition caused irritated and/or lost customers, and complaints to the local public service commission.

With automatic call pacing the telemarketing system would monitor the hit rate, the time that it took for a called party to answer, the time that an agent spent on each call, etc., and adjusted the call pacing rate accordingly. This improvement increased the agent efficiency and also had the benefit of reducing the number of answered calls which were placed on hold.

Early automated dialing systems could only handle one campaign or "split" at a time. Later systems were improved but were still limited to one campaign at a time per agent or group of agents. When a first campaign ended, the system administrator would specify the calling list for a second campaign, and the second campaign would be started. However, during the period between the end of the first campaign and the start of the second campaign the agents would be idle. Some systems now provide for two or more campaigns to be conducted simultaneously. Some agents are designated for the first campaign, and other agents are designated for the second campaign. Other automated dialing systems, such as the system described in U.S. Pat. No. 5,343,518, can be programmed to link campaigns so that, as a first campaign ends, the agents are automatically switched to a second campaign, which may already be in progress.

Further, outbound dialing campaigns have historically performed by extracting information from host files. The host files have information about the customers to be contacted. These files, commonly referred to as calling lists, are collections of records made up of information fields, including the telephone number of the customer to be contacted. The selection and order of the records to be included in a calling list are based on business strategy designed to reach a select type of customer, such as, customers with accounts over 30 days past due. These calling lists, once created, are fixed, or "static", and typically cannot be readily altered. If changes are necessary, then the list is discarded and a new list is created from the host files.

The typical automated dialing system generates a single list for each campaign, and methodically works down through the list, dialing one number after another, until all of the numbers in the list have been dialed. When a list has been completed the system administrator can instruct the system to return to the list, search a field in the list to determine if a call was not successful, that is, the number was busy, not answered, or answered by a machine, etc., and make another attempt at the calls which were previously not successful. Each time that a pass through the list has been completed the system administrator can instruct the system to make another pass through the list or to begin another campaign. Again, this procedure requires the attention of the system administrator, and the system administrator must make a judgment call as to whether there are enough unsuccessful calls remaining in the list to warrant another pass through the list. Further, if another pass through the list is warranted, the system administrator has to decide how many agents to allocate for that pass and how many agents may be moved to service another campaign.

Therefore, there is a need for a system which allows the system administrator to program a "calling strategy" into the system so that the system automatically follows the strategy without the further intervention of the system administrator.

Further, there is a need for a system which will place calls to selected numbers, some of which may have been previously called, and which will place the calls at the time, date, day of week, and/or to the area specified by the customer to be called, the system administrator, and/or the provider of the products/services involved.

Some campaigns are doomed to be ineffective from the very beginning. A state holiday in a first area may not be a holiday in a second area. Therefore, a campaign directed to the second area may have a very low hit rate because most of the customers are at work. Conversely, a campaign directed to the first area may have a high hit rate because it is a holiday there. Also, some campaigns may be successful due to factors which are not controllable, such as weather. A campaign directed to customers in an area which is having good weather on a weekday during working hours may have a low hit rate, whereas another campaign directed to customers in an area which is experiencing adverse weather, such as a snowstorm or blizzard, on the same day during the same hours may have a high hit rate because more customers will be at home. A system administrator would therefore want to terminate the ineffective campaign at an early point, or move some of the agents to a second campaign, or begin a third campaign. However, this requires the system administrator to continually monitor the success of a campaign. The system administrator must then take the appropriate action if the campaign success rate is low.

Therefore, there is a need for an automated customer service system which is easily user programmable to be result-oriented so that ineffective campaigns can be automatically terminated, or some of the agents may be moved to other campaigns, or other campaigns may be started and staffed.

Although most campaigns should be terminated if unsuccessful, some campaigns should be terminated if successful. For example, a calling list may have the names of 100,000 registered voters, but a surveying (poll-taking) organization will only need to contact a small fraction of these voters to obtain meaningful results. If the organization only needs to contact 2,000 voters then the campaign may be terminated once this goal is achieved. Conventional systems require the system administrator to periodically evaluate the results and manually terminate the campaign, or require that the calling list be broken into numerous smaller calling lists and, each time that a smaller calling list is completed, the system administrator can evaluate the results and decide whether to initiate another of the smaller calling lists. This results in extra work and/or delays.

Therefore, there is a need for an automated customer service system which is easily user programmable to be result-oriented so that successful campaigns can be automatically terminated, or some of the agents may be moved to other campaigns, or other campaigns may be started and staffed.

In addition, calls should be placed so as to maximize the responsiveness of the customer to the call. In the world of today, people are constantly bombarded with information, desired and undesired, when desired and when untimely, and where desired and where inconvenient. A person is generally more receptive to information, including advertisements, bills, and requests when that information is presented at the time, at the location, and in the manner desired by that person. A seller, telemarketing organization, debt collection organization, customer service organization, credit-extending organization, investigator, surveying organization, or other such entity, herein collectively referred to as product/service providers or, more simply, providers, should therefore, before contacting a person by telephone or even by mail, consider the preferences of that person as much as possible so as to enhance the likelihood of a successful contact. Currently, many systems allow only a single telephone number for a customer. Systems that allow more than one telephone number for a customer generally start at the first number and call each of the other telephone numbers in sequence until the customer is reached or all of the numbers have been called. Further, if a call is made to a customer at, say, 2 p.m. and the customer or the person who answers indicates that the call should be placed again at a later time, say 4 p.m., then some systems will provide for the call to be placed again at that time. However, this information is generally not kept and, on a subsequent campaign, the call to that customer may again be placed at 2 p.m., even if the customer is never home at 2 p.m. or the customer does not want to be disturbed at 2 p.m. because the customer is always doing something important at that time, such as checking stock prices or taking a nap. Therefore, there is a need for a system which is responsive to the preferences of the customer so that, when a call is placed, the customer will most likely be in a frame of mind to give a positive response to the call.

Also, not all customers want to be interrupted by a telephone call. Some may prefer to be contacted by mail, and others may wish to be contacted by facsimile, or by electronic mail. However, current telemarketing systems only provide for one method of communication: voice. Further, most billing systems only provide for one method of communication: mail. Therefore, there is a need for a customer service system which can accommodate a plurality of different communications media and contact the customer in the manner deemed most desirable by the customer.

Also, in conventional systems, the system administrator must manually select which agents are to be assigned to different campaigns. This often involves considering the conflicting requirements of several simultaneous campaigns. This task is frequently so burdensome that it cannot be accomplished in a timely manner and the assignment of agents is less than optimum. In addition, some campaigns may be improperly staffed because agents which are best suited for those campaigns have been assigned to other campaigns which do not require the special skills or qualifications that these agents have. Therefore, there is a need for a customer service system which automatically inspects the campaign requirements, inspects the agent qualifications, and assigns agents to campaigns which need the special skills of those agents.

SUMMARY OF THE INVENTION

One aspect of the present invention is a result-oriented customer service center. This service center also provides for automated dialing. The present invention provides for commands which allow a user, such as the system administrator, to specify the criteria by which the success of a campaign will be evaluated and, therefore, to specify when and if a campaign will be terminated, agents moved to another campaign, or another campaign started and run concurrently with the first and/or other campaigns. The present invention automatically and continuously evaluates the success of a campaign and stops a campaign, suspends a campaign, or takes other action, depending upon the success of a campaign. Therefore, it is not necessary to wait until all the numbers in a campaign have been called before the campaign is terminated and the agents become available to work on other campaigns.

In addition, the present invention allows the system administrator to specify whether all aspects of the campaign will be terminated, or whether only certain aspects of the campaign will be terminated and other aspects of the campaign allowed to continue. The present invention provides for processing a campaign into a plurality of queues. Each queue contains numbers which are related in some predetermined manner. This allows the system administrator to specify that some queues, such as queues which contain numbers which have not yet been called, should not be called, and to specify that other queues should be called, and may specify the time, date, day of week, area, and/or order of calling. The queues to be called may contain, for examples, numbers which were busy, or numbers where the user requested a callback at a later time, or numbers where an answering machine was detected.

Further, the present invention allows the system administrator to specify in advance what action should be taken once a campaign is deemed unsuccessful. For example, the agents of the unsuccessful campaign may be shifted to an ongoing campaign, assigned to a new campaign, or used to service multiple campaigns.

Further, the present invention allows the system administrator to specify in advance what action should be taken once a campaign is deemed successful. For example, once the goal of the campaign has been achieved then the campaign is automatically terminated, and some or all of the agents may be moved to other campaigns, or other campaigns may be started and staffed.

The present invention transforms the traditional, static calling list into a plurality of dynamic call record queues. Each of these queues is under the control of the system administrator. Calling records begin in a "to-be-called" queue and, as call attempts are made, each record is moved to another queue depending upon the disposition of the attempted call. The call record may be moved to a completed call queue if contact was made with the customer and the transaction successfully completed, or one of several incomplete call queues if contact was not made, the desired customer was not available, or another call (a "call back") is required for any reason. A callback might be necessary if, for example, the customer had to terminate the call to leave for a meeting. The incomplete call queues can then be used to attempt callbacks to the customer. The system administrator can enable or disable calling from the incomplete queues at will or as part of a preselected calling strategy, that is, a "strategy script".

Strategy scripts are created and saved as files that can be opened, executed, modified, and saved under different file names. Strategy scripts operate on events such as time, date, day of week, area, or hit rate or other criteria that the system administrator selects when creating the strategy. Actions are automatically taken when preselected threshold conditions are met. The action taken can be a simple as notifying the system administrator or a designated agent of the condition or as intensive as terminating the current campaign, enabling or disabling callback from the incomplete queues of the current campaign, reassigning agents, and starting a next campaign.

Accordingly, it is an object of the invention to provide an automated customer service system, and methods for the operation of same, which allow a user to specify the conditions under which a campaign will be terminated or modified.

It is another object of the present invention to provide an automated customer service system, and methods for the operation of same, which allow a user to specify whether all aspects of a campaign will be terminated, or whether only certain aspects of the campaign will be terminated and other aspects of the campaign allowed to continue.

It is yet another object of the present invention to provide an automated customer service system, and methods for the operation of same, which allow the system administrator to specify what action should be taken after a campaign is terminated.

It is yet another object of the present invention to provide an automated customer service system which the system administrator can provide with a calling strategy, prior to beginning a campaign, so that the system automatically makes calls to one or more of the following: numbers which were previously busy; numbers which were previously not answered; numbers which were previously answered by an answering machine; numbers which are to be recalled; numbers to which correspondence is to be sent by fax or by electronic mail; numbers that were previously detected as being answered by a facsimile machine or a modem; and numbers which resulted in intercept tones. The present invention allows the system administrator to specify which, if any, of the incomplete call queues will be used for another dialing attempt, a time for starting dialing for each of the incomplete call queues, and an order in which the incomplete call queues are to be used or different priorities or weighting factors for the different incomplete call queues. For example, the system administrator may specify that only the callback queue and the answering machine queue are to be used for further dialing and that the no answer queue and the busy queue are not to be used for further dialing. The system administrator can further specify whether calling from the callback queue and the answering machine queue is to start when the to-be-called queue has been completed, or whether calling is to start at a specified time, which may be before completion of the to-be-called queue. Further, the system administrator can specify that the callback queue has twice the priority, or weight, of the answering machine queue so that two calls will be placed from the callback queue for every call placed from the answering machine queue.

The present invention therefore allows the system administrator to specify which queues will be used for further calling, the time, date, day of week, area, and/or order, or priority, of the calling. This allows the system administrator great flexibility in devising a strategy up front to achieve a high campaign success rate and a high agent efficiency.

Another aspect of the present invention is a customer service system which contacts the customer in the manner preferred by the customer. The preferences of the customer are herein referred to as a Customer Sensitivity™ profile. "Customer Sensitivity" is a trademark of Melita International Corporation, Norcross, Ga., U.S.A. Some of the factors that are included in the customer sensitivity profile are: the language that the customer prefers; the time of day and the telephone number at which the customer prefers to be called; the address at which the customer prefers to receive mail, which address may vary from time-to-time on a regular or irregular basis; whether the customer prefers to receive correspondence by mail, by facsimile, or by electronic mail; and whether the customer prefers most or all contacts to be by voice or correspondence. Other factors may also be developed for the customer sensitivity profile. These customer sensitivity profile factors are different from the sales profile factors normally kept for a customer, such as income, marital status, number of children, income bracket, etc. Typical sales profiles factors are directed toward determining what items/services should be presented to the customer, and not toward determining the contact preferences of the customer: where, when, or how the customer wants to be contacted. Therefore, it is an object of the present invention to contact the customer in accordance with a customer sensitivity profile. Some possible factors for the customer sensitivity profile are listed above.

To be useful, a customer sensitivity profile must be current. Therefore, the present invention automatically checks the date of the last update of the customer sensitivity profile each time that the customer is contacted or calls in. If the last update is recent then the desired transaction is conducted. If the last update is not recent then the customer is asked whether now is a convenient time to update the profile. If so then the profile is updated. If not then the desired transaction is conducted. Therefore, the present invention provides for the creation and automatic maintenance of the customer sensitivity profile.

Another aspect of the present invention is the automatic and proper assignment of agents to campaigns. The present invention provides for an agent qualification profile which identifies any special skills or qualifications that an agent may possess, such as language skills, type of voice, efficiency, type of call processing skills (e.g., sales, collections, customer service), etc. This allows the system administrator to devise a strategy script based upon the customer sensitivity requirements and, the agent qualifications. The strategy script determines which agents meet which requirements, and whether there are adequate agents to handle the requirements of concurrent campaigns. The strategy script also provides for assignment of the agents in accordance with a preplanned priority or procedure in the event that there are not adequate qualified agents available. Therefore, the present invention provides for the automatic identification of the requirements of each campaign and the agents which meet these requirements, and assigns the agents to the campaigns based on a predetermined strategy.

Another aspect of the present invention is the automatic and proper assignment of resources to campaigns. The present invention provides for identification of the system resources, such as the number of modems available, the number of facsimile machines available, the number of telephone lines available, the number of toll-free inbound telephone lines available, the number, type and cost of telephone lines available for local and long-distance outbound calling, etc. This allows the system administrator to devise a strategy script based upon the customer sensitivity requirements and other campaign requirements. The strategy script determines these requirements, and whether there are adequate resources to meet the requirements of concurrent campaigns. The strategy script also provides for assignment of the resources in accordance with a preplanned priority or procedure in the event that there are not adequate resources available. Therefore, the present invention provides for the automatic identification of the requirements of each campaign and the resources needed to meet these requirements, and assigns the resources to the campaigns based on a predetermined strategy.

Other objects, features, and advantages of the present invention will become apparent upon reading the following description of the preferred embodiment, when taken in conjunction with the drawings and the claims.

BRIEF DESCRIPTION OF THE DRAWINGS

FIGS. 3A–3C are an abbreviated flow chart illustrating the operation of the present invention.

FIG. 5 is a flowchart illustrating the creation and maintenance of the customer sensitivity profile.

FIG. 7 is a flow chart of the agent assignment strategy process.

DETAILED DESCRIPTION OF THE INVENTION

Figure 1:
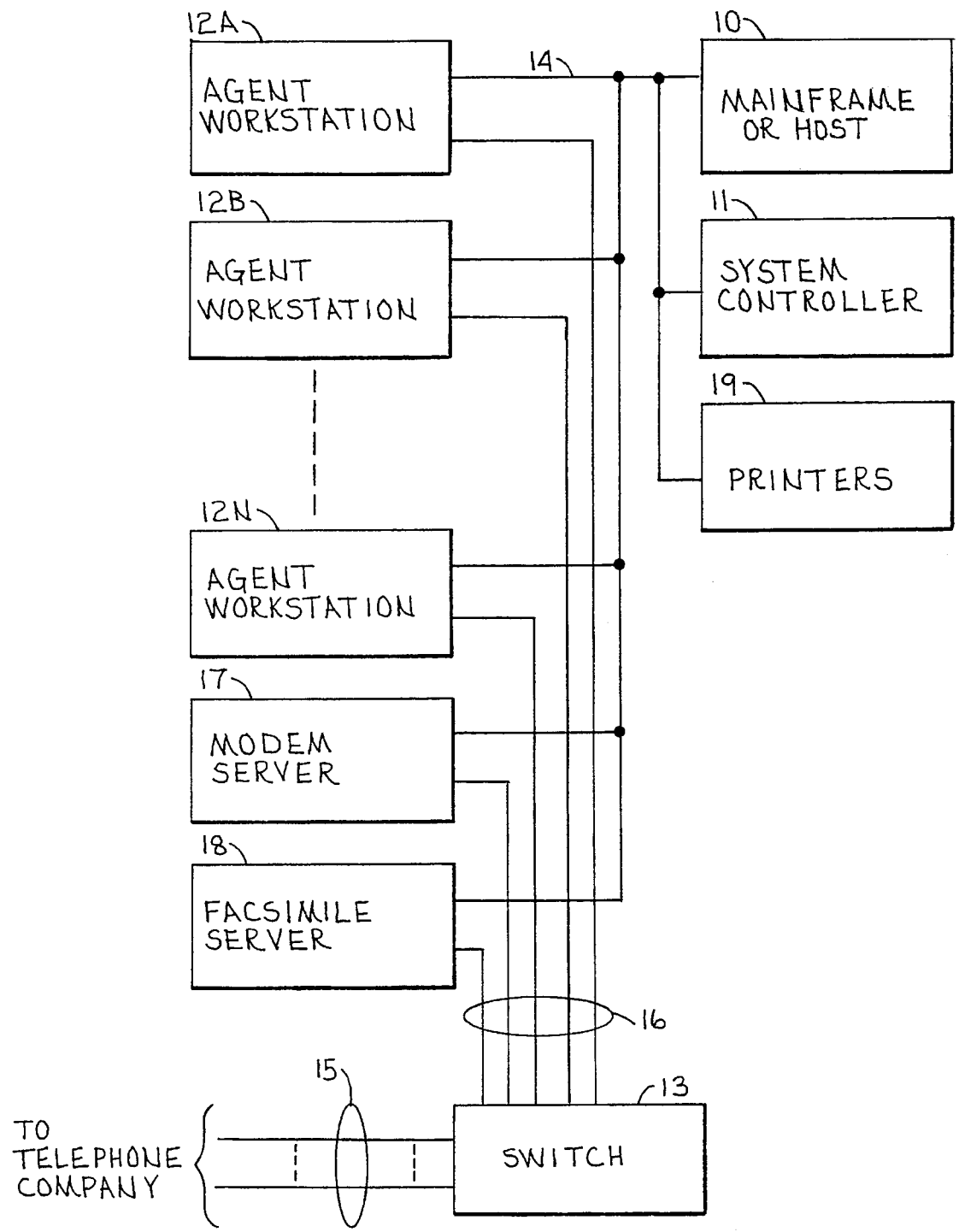
FIG. 1 is a block diagram of the preferred embodiment of the present invention.

FIG. 1 is a block diagram of the preferred embodiment of the present invention. A host or mainframe 10 contains the customer account records for the different campaigns which are to be conducted. A controller 11 controls the overall operation of the system as described below. The controller 11 obtains customer records from the host 10, controls the placement of outbound calls and the answering of inbound calls, monitors and controls the switching or movement of agents between different campaigns and different types of calls (inbound or outbound), controls the call pacing rate, monitors and controls work assignments; monitors and controls the call flow; and monitors the results of each call. A plurality of agent workstations 12A–12N allow the agents (not shown) to communicate with the customer (called or calling party), and enter the results of the communication with the customer, such as enter an order, change an order, cancel an order, obtain information, send a fax or a letter, etc. A switch 13, which is controlled by the controller 11, selectively connects the calls (inbound and outbound) to the agent workstations 12A–12N via lines 16. Switch 13 may be, for example, a PBX, a PABX, an ACD, a dialer, a crosspoint switch, or a combination of the above, as desired or as necessary to meet the requirements of a particular installation. In the preferred embodiment, controller 11 causes switch 13 to dial outbound calls, answer and manage inbound calls, and decode dual tone multiple frequency (DTMF) tones, and decode automatic number identification (ANI), dialed number information service (DNIS), and other telephony signals. The agent workstations 12A–12N, switch 13, the controller 11, and the host 10 are all connected via a network 14. The network 14 is not critical and need only be fast enough to accommodate the transfer of information, such as customer account records, at a speed which prevents delays at the agent workstations. Controller 11 and switch 13 may instead be directly connected via a separate signal path (not shown) if desired. Except for the improvements to the operation of the host 10 and/or the controller 11 described herein, the details of operation of the system are generally as described in the following U.S. Pat. Nos. 4,797,911; 4,894,857; and 5,214,688. The present invention further provides for a facsimile server 18, a modem server 17 for electronic mail transmissions, and one or more printers 19 for printing out correspondence which is to be mailed to the customer. The facsimile server 18, the modem server 17, and the printers 19 are preferably connected to the telephone lines 15 via the switch 13. The facsimile machine 18 and the modem 17 are preferably connected through the network 14 to the system controller 11 but may be directly connected to the host 10 if desired. The present invention provides for a system administrator to specify the campaign strategy and control the operation of the campaign where manual intervention is desired. The workstation for the system administrator is preferably one of the agent workstations 12. System administrator workstation status may be conferred upon a particular workstation by logging in under a system administrator password, or by designating, in the software or firmware of controller 11, that a particular workstation(s) is(are) a system administrator workstation(s). The system administrator workstation may also be a separate, different terminal (not shown). The term system administrator is used herein to describe a person who has authority and decision-making authority beyond that of an ordinary agent. A system administrator may be, for example, a senior agent, an officer of the company which owns the customer service system, etc.

Although the embodiment of FIG. 1 is preferred, it should be appreciated that controller 11 may be part of or included within host 10, so that host 10 performs the control functions and the separate controller 11 is eliminated.

In the preferred embodiment, the controller 11 obtains one or more calling lists from the host 10, with each calling list preferably being for a different campaign. Also, controller 11 obtains the calling strategy for the campaigns to be initiated. In the preferred embodiment the calling strategy is contained in controller 11 but, if desired, the calling strategy may be in host 10, and may be directly linked to a particular campaign.

The controller 11 establishes several queues for each campaign: a to-be-called queue, which initially will contain a list of all of the records in the calling list, and preferably includes time zone information; a completed queue, which contains a list of the records for which transactions have been successfully completed; a fax queue, which contain lists of numbers to which a facsimile message is to be sent; a modem queue, which contain lists of numbers to which an electronic mail message is to be sent; a busy queue, which contains a list of the records which had a busy telephone number; an unanswered queue, which contains a list of the records for which the call was not answered; an answering machine queue, which contains a list of the records for which the call was answered by an answering machine; a callback queue, which contains a list of the records for which the call was answered and the answering party advised that the call should be placed again at a later, preferably specified, date and time; and intercept queues, which contain lists of the records for which predetermined three-tone intercepts were detected. The busy, no answer, callback, answering machine, and intercept queues are collectively referred to herein as incomplete queues because a call has been made, but has not been successfully completed. Other queues may also be created, or some of the above queues may be consolidated, depending on the degree of precision desired in recording how a call was processed and whether a callback for that type of call warrants being handled differently than a callback for a call from one of the other incomplete queues.

Controller 11 then begins the campaign, and logs the result of each call into the appropriate queue. After the campaign has placed a sufficient number of calls to obtain a meaningful analysis, controller 11 inspects the queues to determine the degree of success of the campaign. If the completed queue shows a substantial number of completed calls then the campaign may be continued without any changes. If the completed queue shows an unacceptable number of completed calls then the campaign may be automatically suspended or terminated, or an alert may be sent to the system administrator or designated agent so that the system administrator or designated agent can decide whether to manually continue, suspend, or terminate that campaign, or an alert may be sent to the system administrator so that the system administrator will know the action that is automatically being taken and can approve or override the automatic action specified in the strategy script. For example, if there is an excessive number of calls in the no answer queue, the reason may be that it is a nice day outside, and there is no one inside or at home to answer the call. Therefore, the campaign may be automatically suspended for a predetermined length of time, say two hours, and then resumed. If the campaign continues to have an unacceptable number of completed calls then the campaign is terminated.

Also, if the goal of the provider is to obtain a certain number of completed calls then the campaign will be deemed successful once that number of completed calls has been achieved. In this case, if the completed call queue shows that the desired number of completed calls has been achieved then this campaign may also be automatically suspended or terminated. Other goals may also be specified, tested for, and acted upon. Some examples of other goals are: the dollar amount collected in a collection campaign; the dollar amount sold in a sales campaign; and the number of products or services sold in a sales campaign. The present invention therefore provides for great flexibility in determining the desired results of the campaign and what action should be taken at any point in the campaign. In the examples above, one campaign was terminated because it was unsuccessful, whereas another campaign was terminated because it was successful.

When a campaign is suspended or terminated then, depending upon the strategy selected by the system administrator, all calls for that campaign may be stopped, or only some calls. In the case of the campaign for the surveying organization, once the desired number of voters has been contacted then there is no need to make any further calls and so it is desirable to completely terminate that campaign and not make any further calls from any queue. However, for another campaign, the desired effects of termination may be that customers in the to-be-called queue and the no answer queue will not be called, but customers in the busy queue or the callback queue will still be called. Therefore, the system administrator has great flexibility in planning, and complete control over, the operation of a campaign via the strategy script. The system of the present invention will automatically execute the strategy script without further attention by the system administrator.

When a campaign is suspended or terminated the agents become free so, in the preferred embodiment, the controller 11 automatically reassigns the agents from that campaign to another campaign. The campaign(s) to which the agents are assigned may be manually selected by the system administrator or may be automatically determined by controller 11 via the strategy script. For example, controller 11 may assign these agents to a campaign which is being started as a result of the suspension or termination process, may assign these agents and/or additional agents to an ongoing campaign which is having a high success rate, or may split these agents among several campaigns, depending upon the success rate of each campaign, the number of calls that remain to be made in each campaign, the level of inbound call traffic, or other criteria.

Even if, or especially if, the campaign is successful it is desirable to control the disposition of the incomplete queues rather than simply leaving calls in these queues to be redialed after the to-be-called queue has been emptied. The present invention therefore allows the system administrator, via the strategy script, to independently enable or disable calling of entries in each incomplete queue and, if a queue is enabled for calling or recalling, to specify the time, conditions, or order of the redial from the entries in that queue. For example, the strategy script may specify that entries in the callback queue are to be called at the time specified in each of the call records, that entries in the no answer queue are to be called beginning when the to-be-called list is down to 10 percent of its original size, and that entries in the fax queue, modem queue, special tones queue, and answering machine queue are to be called beginning at 5 p.m., with the entries in the no answer queue to be weighted as having higher priority than, and called more often (as determined by the weighting factor) than, the entries in the answering machine queue.

The system administrator can therefore plan a calling strategy and the present invention provides for the automatic implementation of that strategy. Further, the strategy can be stored and used again at a later date or modified as desired. In the preferred embodiment, the strategy is stored in controller 11. Preferably, the strategy is preplanned as a concerted effort between the provider and the system administrator. This process is beneficial to both the provider and the system administrator. System administrators frequently run campaigns for several providers and frequently charge on the basis of the number of calls completed, the dollar amount collected, the dollar amount sold, the number of products or services sold, the time involved, the number of agent-hours used, etc. If a campaign is having poor results then the provider will want to terminate the campaign at an early stage. This reduces costs for the system administrator. The provider can then consider why the results were poor and change the strategy and time or day of the campaign, the customers to whom the campaign is directed, etc. Early termination of the campaign may allow the provider to reconsider the products or services offered, the sales pitch used, the target group, etc., at such an early point that the provider can modify the campaign particulars and initiate a second campaign, hopefully successful, on the same day. The provider will benefit from a reduced fee because the unsuccessful campaign was terminated early, and may possibly also benefit from a successful second campaign. In the case of certain types of campaigns, if a campaign is successful, or if the goals have been achieved the provider will want the campaign to be terminated at that point and will not want to pay for time and/or calls made after that point. Early termination of this campaign will therefore please the provider.

The system administrator will also benefit because termination of unsuccessful campaigns, and termination of successful campaigns whose goals have been achieved, will free agents to work on other campaigns, thereby making for other pleased providers. Therefore, the provider with the unsuccessful campaign and the provider with the successful campaign will both want to continue using the services of the system administrator. Also, the ability to automatically terminate a campaign, whether successful or unsuccessful, and reassign the agents, telephone lines and trunk resources, allows the system administrator to employ fewer agents and fewer telephone lines and trunk resources than might otherwise be required because agents may be quickly and efficiently reassigned so as to stay at peak performance.

Queue Flow™

Figure 2:
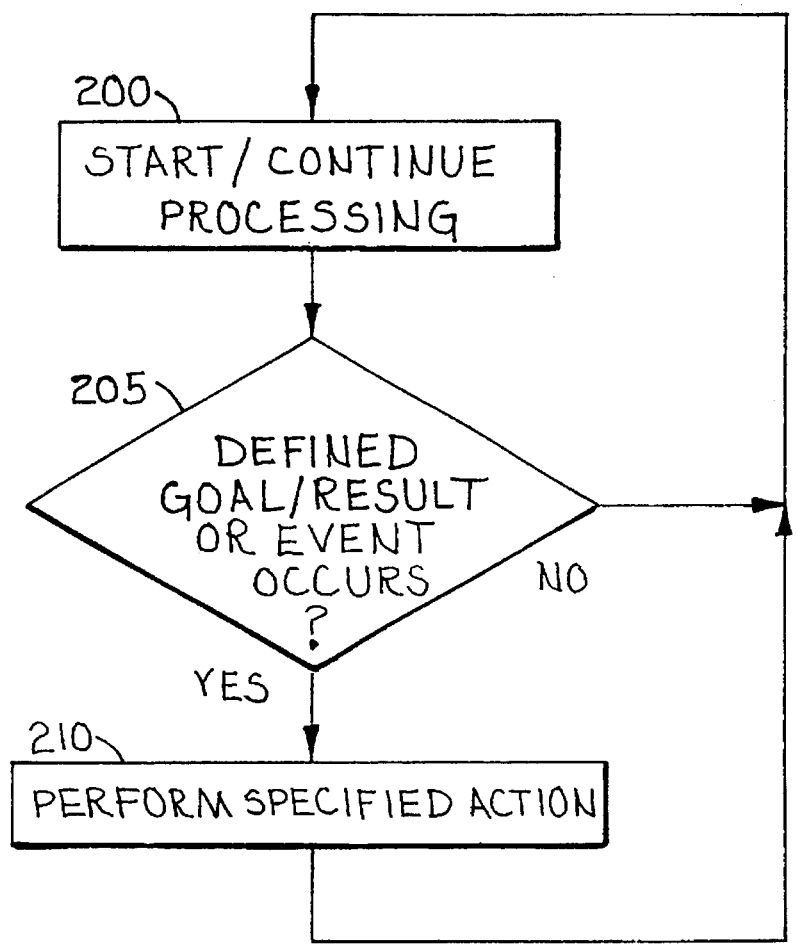
FIG. 2 is an abbreviated flow chart illustrating the result-oriented process of the present invention.

FIG. 2 is an abbreviated flow chart illustrating the result-oriented process of the present invention. QFLOW™ and Queue Flow™ are trademarks of Melita International Corporation, Norcross, Ga., U.S.A. The system administrator, preferably in conjunction with the product/service provider, defines the results or goals to be achieved and the processing strategy that will accomplish those results in the most efficient and expedient manner. This reduces the provider's costs and maximizes the ability of the system administrator to provide quick service to a plurality of providers without having to employ as many agents and telephone resources as would be necessary if a conventional calling process were used for the various campaigns. The processing strategy involves defining events, and then defining the actions that should be taken when an event occurs. An event may be, by way of example and not of limitation, the time of day, the hit rate, the list penetration depth, the disposition of a call, etc. An action may be, by way of example and not of limitation, to start a campaign, to end a campaign, to suspend a campaign, to reassign agents from one campaign to another, to start or end callbacks from selected queues, etc. Briefly, in step 200 the system begins the result-oriented process. This step may involve downloading of files, sorting, calling, handling inbound calls, placing outbound calls, etc. Decision 205 tests for the occurrence of any defined event, or whether a defined goal has been reached, or whether a defined result has been obtained. If the defined event has occurred, the defined goal has been reached, or the defined result has been obtained then, in step 210, the specified action is performed. Step 200 is then executed to continue the result-oriented process. If at decision 205 a defined event, goal, or result has not occurred then step 200 is executed again.

The strategy is preferably written in the form of a series of event-action instructions, referred to herein as a strategy script. An example of a strategy script is shown in the table below. It will be seen from the table that the exemplary events monitored are the time of day, the list penetration, and the hit rate. When the time is 7 am, List A will be started and, at 2 pm, List A will be stopped, except that calling will continue from the recall queue and the answering machine queue. The system administrator will be notified by audible alarm or visual alarm, or both, if the hit rate is less than 25%. List A will also be stopped if the hit rate is less than 20%. With respect to List B, it will be started at 10 am, and calling from the uncalled (to-be-called) queue will be stopped at 4 pm. As in the case of List A, the system administrator will be notified by audible alarm or visual alarm, or both, if the hit rate is less than 25%, and List B will be stopped if the hit rate is 20%. Note that List A and List B are, in this example, both assigned to the control of the same system administrator (Administrator No. 1), and that List A is assigned to Split 1 and List B is assigned to Split 2. Further, when the penetration of List A or List B has reached 90% then List C will be started. List C will be stopped at 7 pm. The action and steps 13 and 14 could, if desired, be implemented as a single step. For example: Stop List C, Admin=1, Split=1 or 2; or Stop List C, Admin=1; or even, Stop List C.

The strategy script presented in the table is exemplary, is brief for convenience of illustration, and is not intended to be limiting. For example, one could add additional steps to monitor the hit rate of List C and take some appropriate action, such as starting List D. Also, when List A is stopped, it will be appropriate to specify the reassignment of agents, for example: Monitor=List A; Event=List A stopped; and Action=Reassign Agents 1, 2, 5–12, and 15 to List C. From the above, it will be seen that the strategy presented by the exemplary script is to start List A, then start List B, and then stop calling from a list if the hit rate for that list is not as desired.

TABLE 1

| STEP | MONITOR | EVENT | ACTION |
|------|---------|-------|--------|
| 1 | Time of Day | Time of Day = 07:00 am | Start List A, Admin = 1, Split = 1 |
| 2 | Time of Day | Time of Day = 10:00 am | Start List B, Admin = 1, Split = 2 |
| 3 | List A | List Penetration ≦ 90% | Start List C, Admin = 1, Split = 1 |
| 4 | List B | List Penetration ≦ 90% | Start List C, Admin = 1, Split = 2 |
| 5 | List A | Time of Day = 02:00 pm | Disable List A, All Queues |
| 6 | List A | Time of Day = 02:00 pm | Enable List A, Recall Queue |
| 7 | List A | Time of Day = 02:00 pm | Enable List A, Answer Machine Queue |
| 8 | List A | Hit Rate < 25% | Set Alarm, Display "List A Hit Rate < 25%" |
| 9 | List A | Hit Rate < 20% | Stop List A |
| 10 | List B | Time of Day = 04:00 pm | Disable List B, Not Called Queue |
| 11 | List B | Hit Rate < 25% | Set Alarm, Display "List B Hit Rate < 25%" |
| 12 | List B | Hit Rate ≦ 20% | Stop List B |
| 13 | Time of Day | Time of Day = 07:00 pm | Stop List C, Admin = 1, Split = 1 |
| 14 | Time of Day | Time of Day = 07:00 pm | Stop List C, Admin = 1, Split = 2 |

Some examples of Events which are monitored are: Time of Day; Day of Week; Date; Penetration Depth≧Minimum; Penetration Depth≧X %; and Campaign Success Rate. Some examples of Actions are: Enable, Disable (Stop), or Suspend—List X, the to-be-called queue, the recall queue, the busy queue, the no answer queue, the answering machine queue, the intercept queue, the fax queue, the modem queue, or all queues; alert the system administrator or selected agents; set the priority of a queue, list, split, or campaign; assign or reassign specified agents; send a message via the fax queue or the modem queue; and send a letter.

Also, the strategy script is stored and may be part of a recurring campaign. For example, the strategy script header may specify to start this campaign/script every Tuesday. This may be a one-time campaign. However, the system administrator may also specify that this is a recurring campaign. For example, assume that the strategy header is: Monitor=Day of Week; Event=Tuesday, Action=Start Strategy Script Alpha (for example). Then, every Tuesday, strategy script Alpha will be started. This type of strategy script allows for, and causes, the system to run every week, or on a specific day of the month, using the specified strategy script.

Figure 3B:
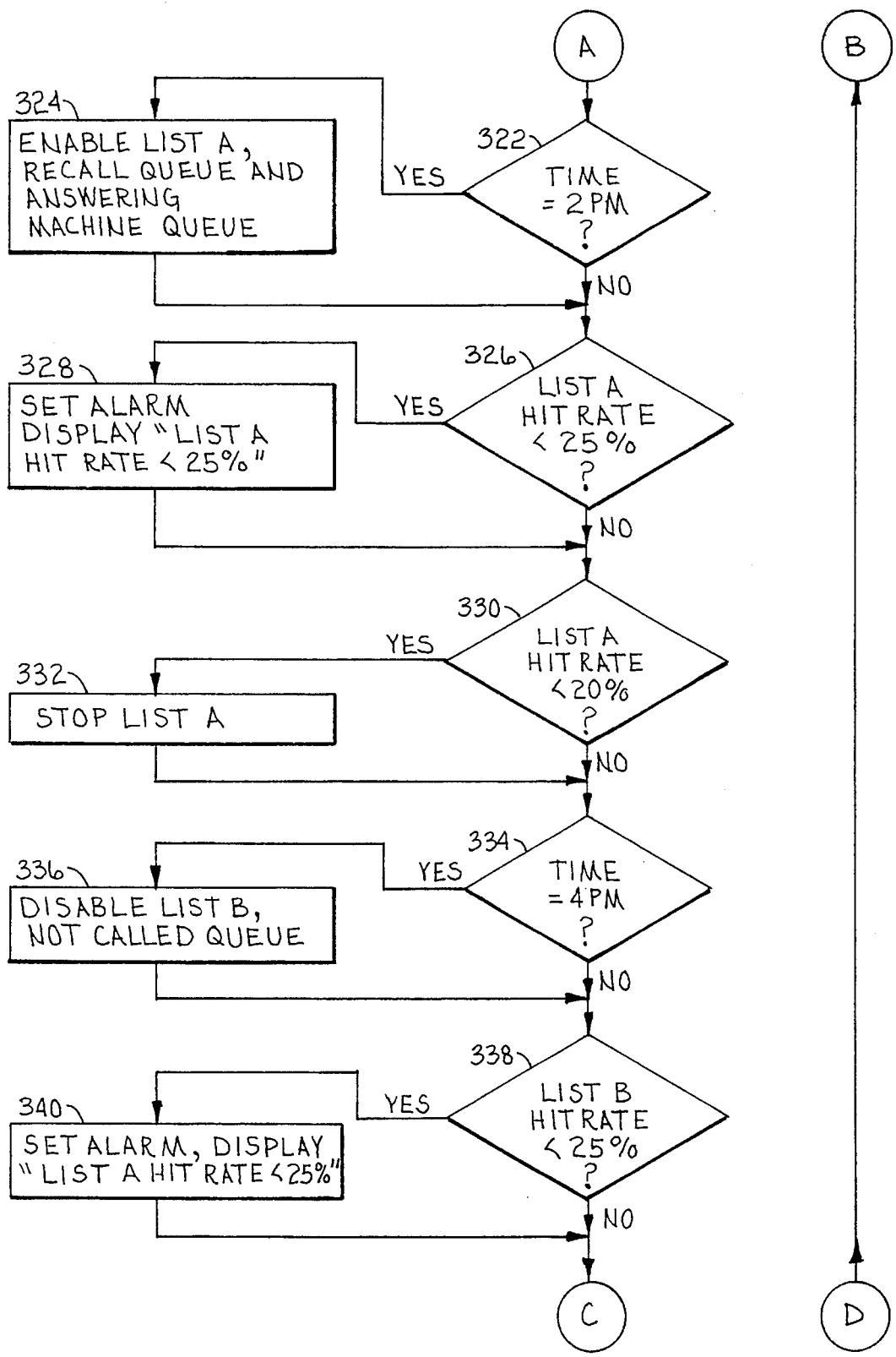
Figure 3C:
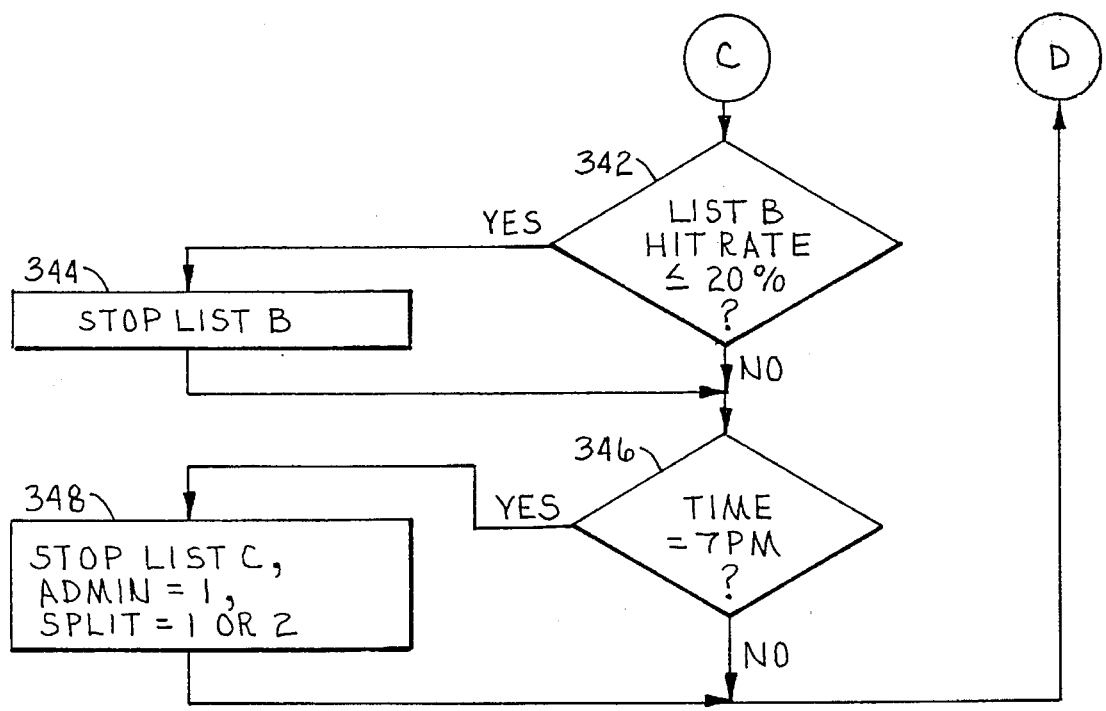
Figure 4A:
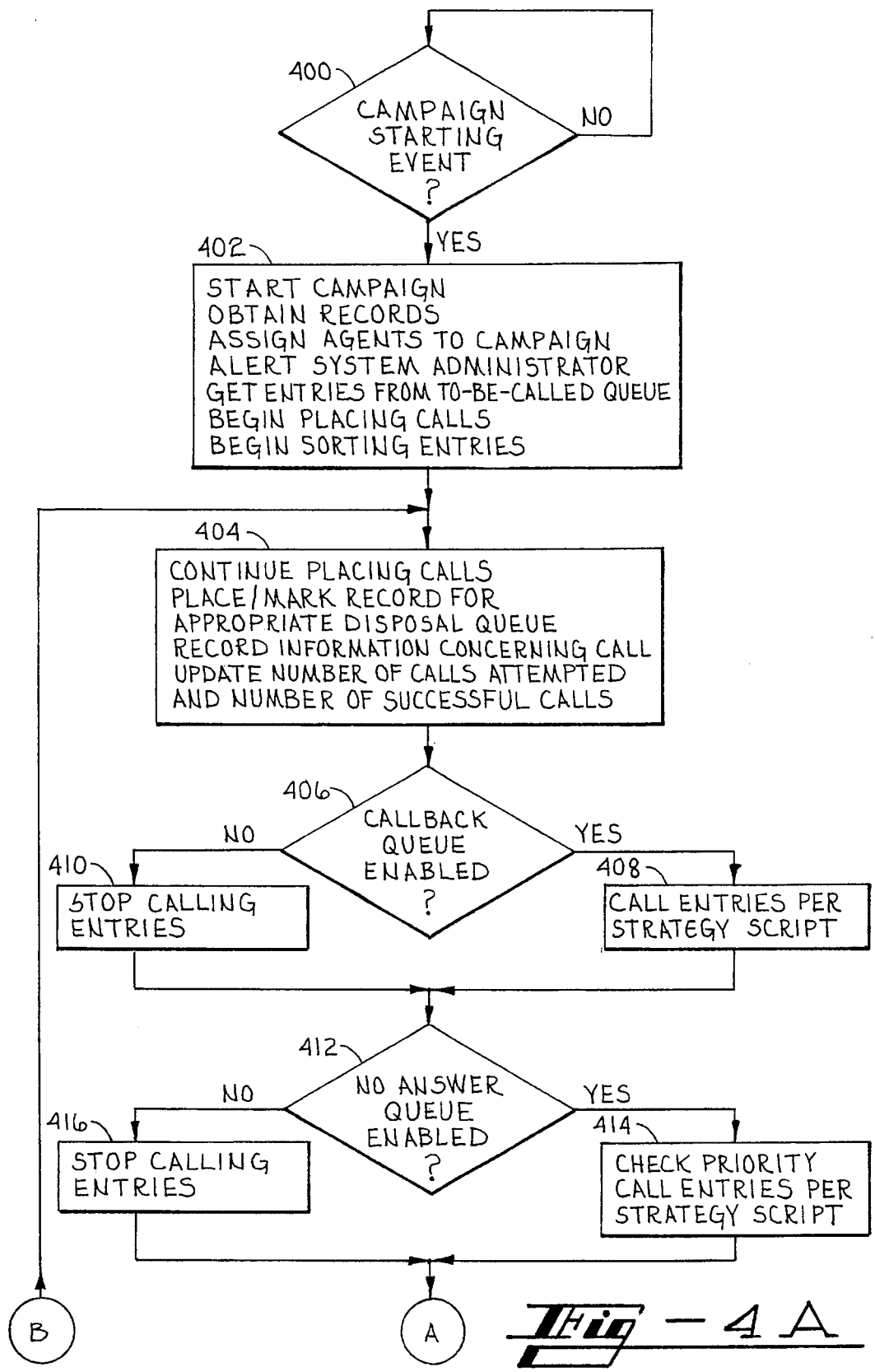
FIGS. 4A–4D are a flow chart illustrating the result-oriented campaign management operation of the present invention.
Figure 4B:
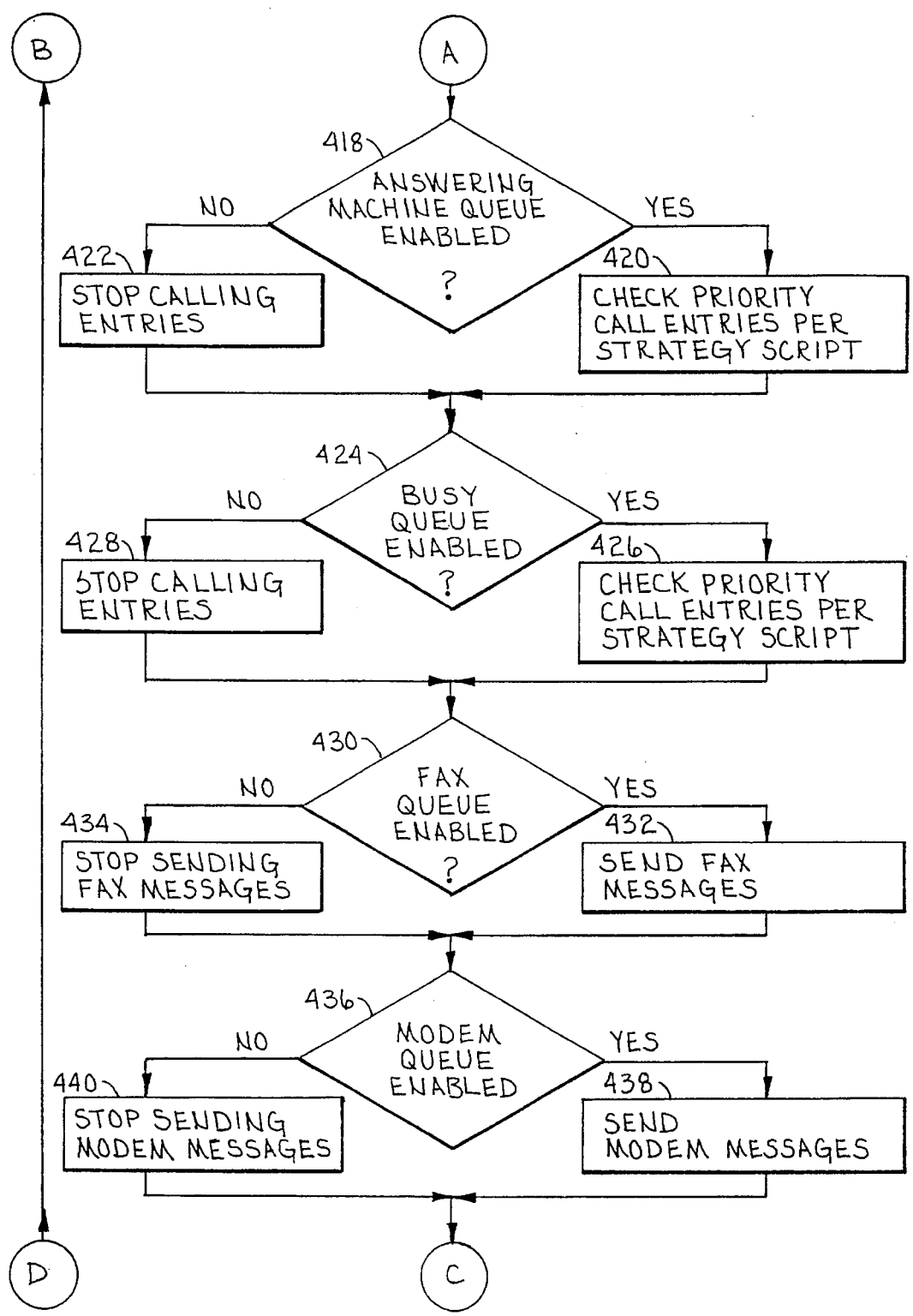
Figure 4C:
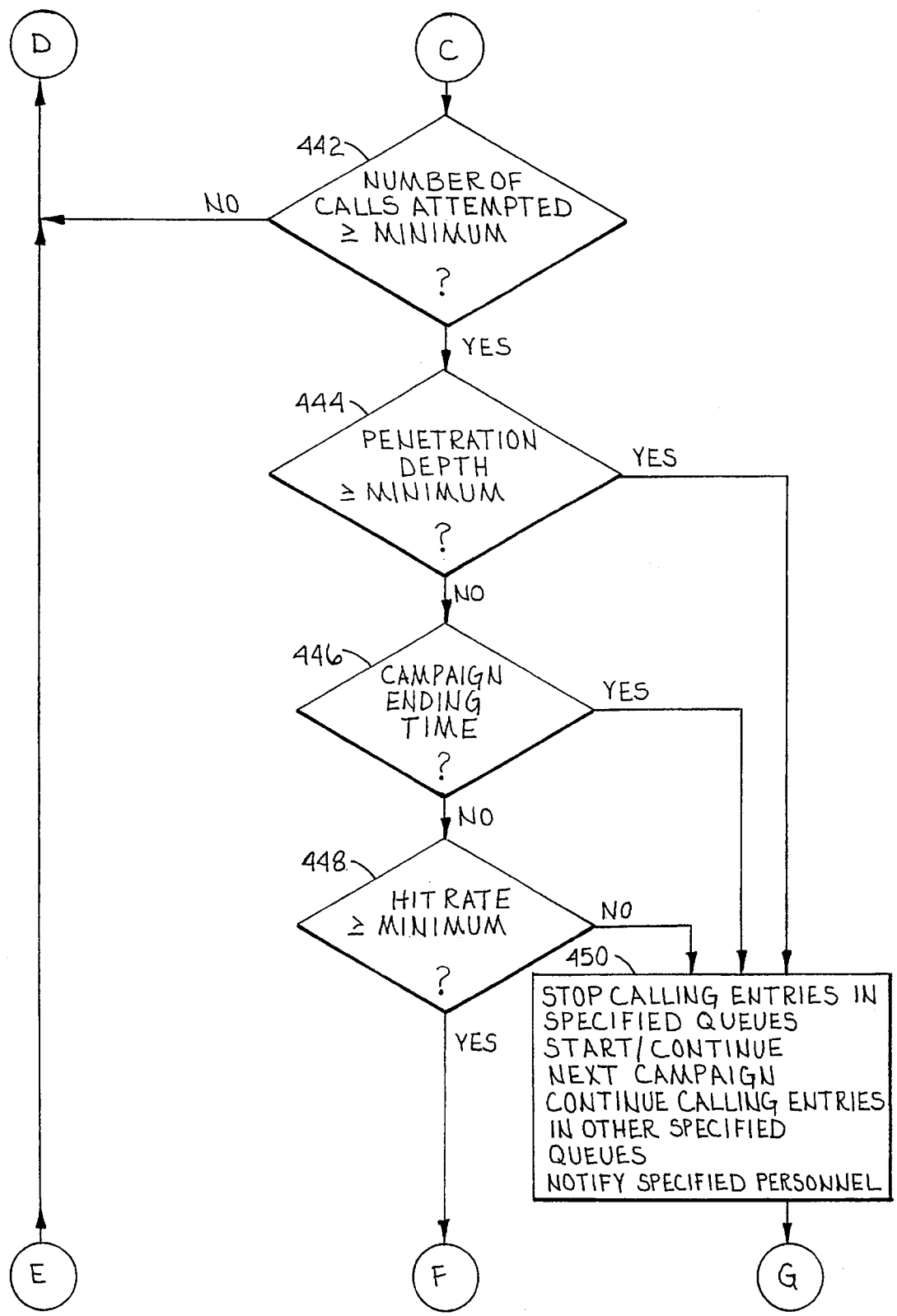
Figure 4D:
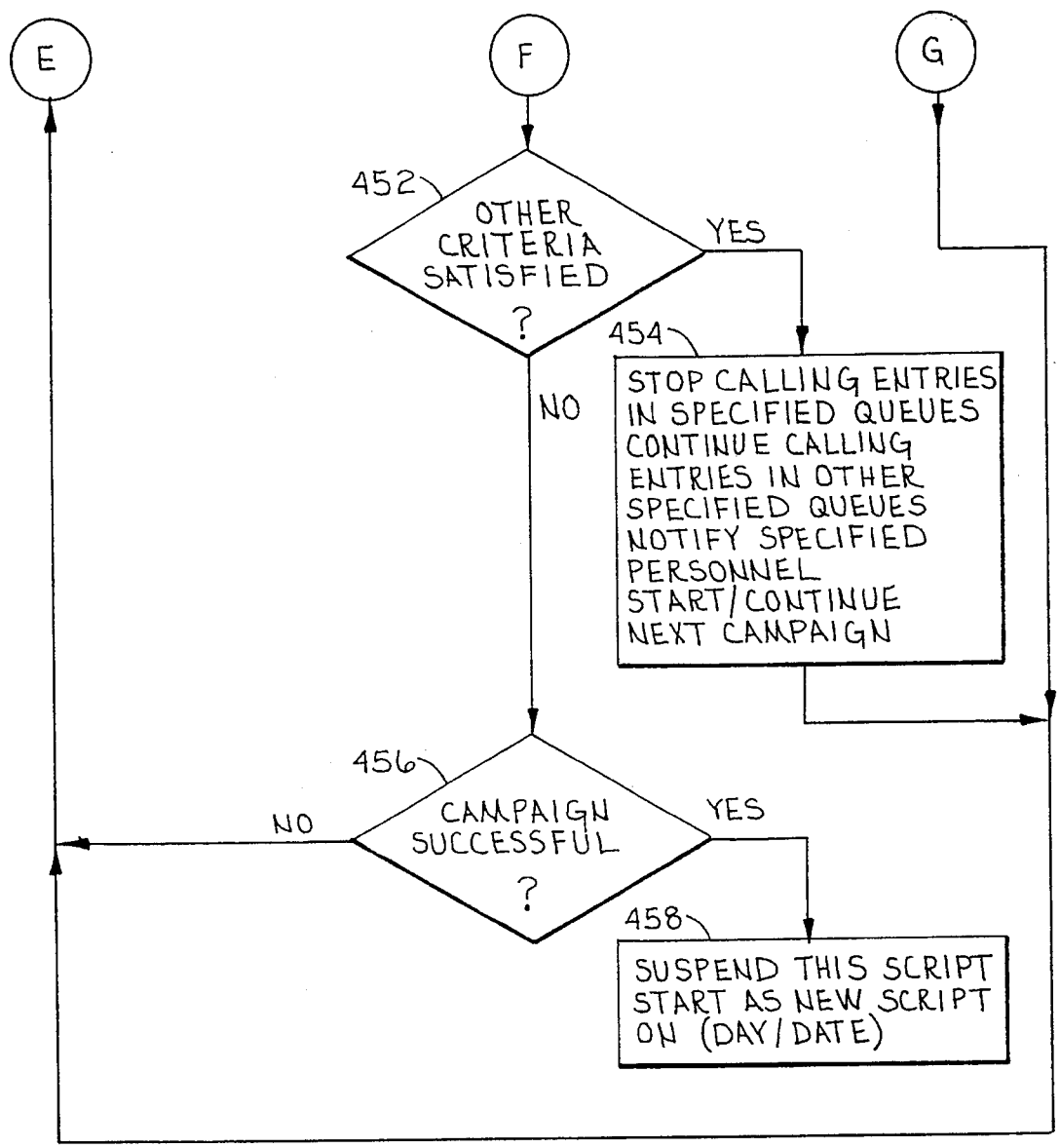

FIGS. 3A–3C are an abbreviated flow chart illustrating the operation of the present invention in accordance with the table. Upon starting 300, decision 302 tests whether the time is 7 am. If so then, in step 304, List A is started. Decision 306 then tests whether the time is 10 am. If so then, in step 308, List B is started. Decision 310 then tests whether calling of List A has reached or exceeded a penetration depth of 90%. If so then, in step 312, List C is started. Decision 314 then tests whether calling of List B has reached or exceeded a penetration depth of 90%. If so then, in step 316, List C is started.

Decisions 318 and 322 then tests whether the time is 2 pm. If so the, in steps 320 and 324, all of the queues in List A are disabled except for the recall and answering machine queues. Decision 326 then tests whether the hit rate for List A is less than 25%. If so then, in step 328, the alarm is set, and a notice display is presented for selected personnel, such as the system administrator and/or the lead agent and/or other persons for that campaign. The alarm may be a visual alarm, audible alarm, or both. Further, the alarm may be a telephone call. For example, if the system administrator has left the building, the alarm may cause the system administrator's home telephone number, pager number, etc., to be dialed and a prerecorded message delivered, or a telephone number delivered which the system administrator can call to determine the nature of the alarm. Also, facsimile messages or electronic mail messages may be sent to alert a specified person or persons at any desired location. Decision 330 then tests whether the hit rate for List A has fallen below 20%. If so then, in step 332, calling from List A is stopped.

Decision 334 tests whether the time is 4 pm. If so, in step 336, the not called (to-be-called) queue of List B is disabled so that there are no further calls from this queue. Decision 338 tests whether the hit rate for List B is less than 25%. If so then, in step 340, the alarm is set, and a notice display is presented for selected personnel. Decision 342 then tests whether the hit rate for List B less than or equal to 20%. If so then, in step 344, calling from List B is stopped. Decision 346 then tests whether the time is 7 pm. If so then, in step 348, calling from List C is stopped. The system then returns to decision 302 to repeat the series of tests.

FIGS. 4A–4D are a flow chart illustrating the result-oriented campaign management operation of the present invention. This operation involves the creation of several queues from the calling list, enabling and disabling of call operations from those queues, and the automatic management of the campaign in response to the level of success of the campaign. This process is referred to herein as QUEUE FLOW™. This operation is preferably performed by the controller 11.

Decision 400 tests whether a campaign starting event has occurred. A campaign starting event may be, for example, the time of day, the day, the date, the status of another campaign, etc. If such an event has not occurred then decision 400 is repeated. If such an event has occurred then, in step 402, the campaign is started. This includes obtaining the customer records for the campaign from the host 10 and placing these records in the to-be-called queue. It will be appreciated that the customer records may also be obtained by other means, such as magnetic tapes, floppy disks, and other media. Agents are also assigned to the campaign. Further, selected personnel, such as the system administrator, are notified of the start of the campaign.

The system then obtains some entries from the to-be-called queue and begins placing calls for the campaign. Dialing may be started using the first numbers (or the last numbers, or any other predetermined point) in the list while the remaining numbers in the list are being sorted. Concurrently, the system begins sorting the entries in the to-be-called queue. It should be appreciated that entire records need not be placed in the to-be-called queue. For example, for the sorting process, only a record index number and the information needed for the sort process are needed. And, for the calling process, only a record index number and/or the number to be called are needed. Likewise, for the busy queue, no answer queue, and answering machine queue, etc., only a record index number and/or the number to be called are required because that is sufficient to identify the customer. Therefore, queues need not contain complete records for customers but may contain abbreviated records or just pointers to a data base or record index numbers and/or the telephone numbers. After the records, record index numbers, or other relevant information are obtained and placed in the to-be-called queue, the records in the to-be-called queue are sorted according to criteria selected by the system administrator. The sorting process may, if desired, take place before dialing is started. Sorting may also occur during a batch record transfer operation. For example, the list may be sorted by area code, and those area codes in the eastern time zone may be called first, or may not be called at all if it already a late hour in the eastern time zone. Those area codes in the pacific time zone will be called later, especially if it is still a very early hour in the pacific time zone.

In step 402, the system continues placing calls, even while the sort procedure is in process. Of course, the system examines the record for each entry before placing a call for that entry so that a call will not be placed at the wrong time, or using the wrong media. After a call has been placed then the customer should no longer be listed in the to-be-called queue. Therefore, after the call is terminated, for whatever reason, the customer is marked off or removed from the to-be-called queue and is marked or placed in an appropriate disposal queue. Depending upon the result of the call, the appropriate disposal queue may be the completed call queue or any one of the incomplete call queues, such as the busy queue, the no answer queue, etc. In the preferred embodiment, this re-marking or movement from the to-be-called queue to the appropriate queue is performed even if the appropriate queue has not been enabled for redialing. The system records the information concerning the call, such as time of day, duration of the call, the agent handling the call, whether an order was placed for an item or service, whether agreement was reached with respect to the next payment, etc. Further, the system updates two statistics for the campaign: the number of calls attempted; and the number of successful calls. Whether a call is successful depends upon the criteria set by the system administrator and the provider. For one campaign, a call may be deemed successful if a live person answers the call. For another campaign, a call may be deemed successful only if the customer orders a product or service.

Decision 406 tests whether the callback queue has been enabled for calling of entries in the callback queue. If so then, in step 408, calling is started or continued for entries in the callback queue in accordance with the strategy script. The strategy script may specify, for example, the time of day, day, or date that calling from this queue is to begin, and each customer record may specify a particular time of day, day, or date that such entry is to be called, the priority or weight that is assigned to the callback queue, etc. Decision 412 is then executed. If the callback queue has not been enabled for calling then, in step 410, if calling was previously enabled, then the calling of entries from this queue is terminated. Decision 412 is then executed.

Decision 412 tests whether the no answer queue has been enabled for calling of entries in the no answer queue. If so then, in step 414, calling is started or continued for entries in the no answer queue in accordance with the strategy script. Decision 418 is then executed. If the no answer queue has not been enabled for calling then, in step 416, if calling was previously enabled, then the calling of entries from this queue is terminated. Decision 418 is then executed.

Decision 418 tests whether the answering machine queue has been enabled for calling of entries in the answering machine queue. If so then, in step 420, calling is started or continued for entries in the answering machine queue in accordance with the strategy script. Decision 424 is then executed. If the answering machine queue has not been enabled for calling then, in step 422, if calling was previously enabled, then the calling of entries from this queue is terminated. Decision 424 is then executed.

Decision 424 tests whether the busy queue has been enabled for calling of entries in the busy queue. If so then, in step 426, calling is started or continued for entries in the busy queue in accordance with the strategy script. Decision 430 is then executed. If the busy queue has not been enabled for calling then, in step 428, if calling was previously enabled, then the calling of entries from this queue is terminated. Decision 430 is then executed.

Decision 430 tests whether the facsimile queue has been enabled for calling of entries in the facsimile queue. This queue allows the sending of correspondence by facsimile to those customers who have so requested. If so then, in step 432, calling is started or continued for entries in the facsimile queue in accordance with the strategy script. Decision 436 is then executed. If the facsimile queue has not been enabled for calling then, in step 434, if calling was previously enabled, then the calling of entries from this queue is terminated. Decision 436 is then executed.

Decision 436 tests whether the modem queue has been enabled for calling of entries in the modem queue. This queue allows the sending of correspondence by electronic mail to those customers who have so requested. If so then, in step 438, calling is started or continued for entries in the modem queue in accordance with the strategy script. Decision 442 is then executed. If the modem queue has not been enabled for calling then, in step 440, if calling was previously enabled, then the calling of entries from this queue is terminated. Decision 442 is then executed.

Not shown for convenience and brevity of illustration, are decisions concerning other queues, for example, the intercept tones queues.

The order of the decisions and steps in the program is, for the most part, not critical. For example, the order of decisions 406, 412, 418, 424, 430, and 436 may be interchanged as desired. Therefore, variations in the order of the decisions and steps, and different types of decisions and steps, which accomplish the same purpose, will suggest themselves to one of skill in the programming field. Such variations and differences should be understood as coming within the scope of the present invention.

As discussed above, it is desirable at an early stage to terminate a campaign which is not successful, a campaign which has reached its desired goal, and/or to start a second campaign, so as to obtain a high hit rate, keep the agents busy, obtain a high agent efficiency, and eliminate the placement of unnecessary calls. However, to properly determine the success of the campaign, some statistically significant number of calls must have been attempted. Then, once this number of calls has been attempted the campaign success may be evaluated. Decision 442 tests whether this minimum number of calls has been placed. This may be an actual number or may be a specified percentage of, for example, the original number of entries in the to-be-called queue. This number is programmed by the system administrator and can be changed at any time, even while a campaign is in progress. If not then a return is made to step 404 to place the next call. If at least this minimum number of calls has been placed then decision 444 is executed.

Decision 444 tests the penetration depth of the campaign. The desired minimum penetration depth is selected by the system administrator and may be a percentage of the original number of entries in the to-be-called queue, or may be a fixed number. For example, the penetration depth may be 90 percent. This number is not critical but is based on the preference of the system administrator. This test is used to determine whether to begin some other action, such as to start another campaign. If a campaign is 90 percent completed then, very shortly, agents will become idle. Therefore, if the penetration depth has reached the minimum then, in step 450, the next campaign is started, or continued if already in progress, entries in specified queues are not called, entries in other specified queues will continue to be called, and the specified personnel are notified of, for example, the penetration depth, which queues are enabled or disabled, and which next campaign is being started. Because the campaign is almost over, calling of entries in, for example, the no answer queue might be stopped, whereas calling of entries in the busy queue may continue. The system then returns to step 404.

If, at decision 444, the minimum penetration depth has not been reached then decision 446 tests whether it is time for the campaign to end. If so then step 450 is executed. If the campaign is to be completely ended then calling will be terminated from all queues. Otherwise, calling may be ended from, for example, the to-be-called queue and the no answer queue, but allowed to continue for the busy queue, the callback queue, and the answering machine queue. Also, the next campaign is started, or continued if already in progress.

If, at decision 446, it is not time for the campaign to end then decision 448 tests whether the campaign hit rate is at least a minimum acceptable number. If the campaign hit rate is too low then resources are being wasted. Most likely, telephone trunks are being used to dial calls which are not answered or are busy, and there are not enough completed calls to keep the agents occupied. Therefore, it may be desirable to end that campaign, or to continue that campaign but start another campaign which may have a higher success rate. Therefore, if the campaign hit rate is too low then step 450 is executed. If the campaign is to be completely ended then calling will be terminated from all queues. Otherwise, calling may be ended from, for example, the no answer queue, but allowed to continue for the to-be-called queue, the busy queue, the callback queue, and the answering machine queue. Also, the next campaign is started, or continued if already in progress.

If, at decision 448, the hit rate is above the minimum acceptable number then decision 452 tests whether other criteria have been met. The other criteria may be tests for different events, or may be tests for some of the same events, but with different thresholds or minimum values. If the other criteria are met then, in step 454, calling of entries in specified queues is stopped, calling of entries from other specified queues is continued, a next campaign is started or continued, and specified personnel are notified of the action. If the criteria are not met then decision 456 is executed.

Decision 456 tests whether the campaign, as a whole, has been successful. The test may be related to the number of calls answered by a live person, the number of calls which resulted in an order being placed for a specific product or service, the total sales figure, the total amount collected, etc. If not then a return is made to step 404. The provider may have had a specific goal in mind for the campaign and, once that goal was reached, the provider did not want to incur any further charges. Accordingly, if the campaign is deemed successful then, in step 458, the campaign is suspended or terminated. The provider may have a recurring need for the campaign so the suspension causes the strategy script to be saved with the specified reactivation conditions, such as a new starting date, day, or time. This causes decision 400 to be executed so that the campaign will automatically begin again when the specified campaign starting event occurs.

If at any decision it is determined that the campaign is to be suspended, or terminated, or another campaign started, the system administrator, and frequently the provider, will want to know why. Therefore, the present invention contemplates providing an indication of the reason for the action to the system administrator by indicating the criteria that caused the action, such as: the number of calls attempted, the penetration depth, the time of day, the hit rate, the number of calls in predetermined queues, the other criteria, etc. This provides the system administrator with additional information so that the system administrator, upon being notified of the action, can determine whether the action is still proper, or what other action should be taken. For example, if the suspension or termination was due to an excessive number of busy entries then the campaign may be restarted after only a short delay, say 30 minutes. However, if the suspension or termination was due to an excessive number of no answer entries and/or answering machine entries then the campaign may be restarted after a longer delay, say 2 hours.

When a campaign is suspended or terminated and/or another campaign is started, the call pacing algorithm may be continued using the statistics already gathered. In the preferred embodiment, statistics are gathered using a moving window approach, as described in the above-referenced patents. This approach is simple and straightforward but this approach may adversely affect the call pacing because the statistics collected for the first campaign may be substantially different than the statistics that will be generated for the second campaign. Several approaches are possible to minimize this impact. If the first campaign is being suspended or terminated then the second campaign may start with statistics input by the system administrator. This approach is useful if the second campaign, or one similar to it, has been run in the past and the previous statistics are available. If the first campaign is continuing and the second campaign is started, or if the second campaign has been started and the first campaign is being resumed after suspension, then other approaches are possible. One approach is to divide the agents between the campaigns based upon the hit rate of the two campaigns. Another approach is to divide the agents between the campaigns based upon the number of agents kept busy by each of the two campaigns. Still another approach is to average the statistics from the two campaigns. The average may be proportioned based upon, for example, the hit rate or the number of agents kept busy. Other approaches for adjusting the call pacing algorithm to minimize the effects of the campaign changes are also possible.

Customer Sensitivity™

FIG. 5 is a flowchart illustrating the automatic generation and maintenance of a customer sensitivity profile. In step 500, the customer is connected. This connection may be as a result of the customer calling in (inbound call), or the system calling the customer (outbound call). The system may be calling the customer as part of a campaign or simply to update the customer sensitivity profile. Decision 502 determines whether the customer has requested to be connected with an agent or the customer has already been connected with an agent. If the answer to either of these questions is yes the customer is connected, or maintains connection, with an agent.

In step 504 the customer record is obtained from the host 10 or the controller 11. For an outbound call, the customer record preferably will already have been obtained in preparation for placement of the call. For an inbound call, the customer may be identified by matching the customer's telephone to a telephone number in the customer account record database. The customer's telephone number may be obtained via an ANI feature or caller identification feature provided by the local telephone company. If the customer's telephone number is not available from the local telephone company, or if the telephone number does not match a number in the database, then the customer is asked to provide the customer's account number and/or telephone number, and/or a personal identification number.

Once the customer record is obtained, decision 506 automatically inspects the customer record to determine the date of the last update for the customer sensitivity profile to determine whether an update is desirable. That is, does the customer record indicate that it has been more than Y months since the last update, or does it indicate that a customer sensitivity profile has never been created for that customer? If either condition exists then an update should be performed. The term "update" as used herein includes the creation of the first customer sensitivity profile. Y is determined by the system administrator and/or provider based upon the provider's needs. If an update is desired then in step 508 the controller 11 causes an update reminder and/or the customer sensitivity profile to be displayed on the screen of the agent's terminal. The agent can then inquire as to whether the customer wishes to update the customer sensitivity profile at that time. If the customer is willing to update at that time then the profile is updated by the agent. After the profile has been updated, or if the customer does not wish to update the profile at that time, or if at decision 506 it is determined that an update is not necessary at that time, then in step 510 the agent proceeds to conduct the business or transaction for which the customer was contacted or called in.

If, at decision 502, an agent is not connected and not necessary then in step 520 the customer record is obtained from the host. For an outbound call, the customer record preferably will already have been obtained in preparation of the placement of the call. For an inbound call, the customer may be identified and the proper record obtained by obtaining the customer's telephone number, account number, personal identification number, etc., as described above with respect to step 504, except that the information is obtained automatically by an interactive process, such as interactive voice response (IVR), rather than by a live agent.

Once the customer record is obtained, the system automatically inspects the customer record to determine the date of the last update for the customer sensitivity profile. Decision 522, like decision 506, automatically determines whether an update is desirable. If so then, in step 524, controller 11 causes voice prompts to be played to the customer inquiring as to whether the customer wishes to update the customer sensitivity profile at that time or at a later time. The customer's response is preferably provided using DTMF tones but voice recognition is also an option. Decision 526 evaluates the response of the customer to the query.

If the customer's response at decision 526 is to update at a later time then, in step 528, the controller 11 will provide a voice prompt asking the customer to specify the date and time for an update call. The customer's response will be recorded and an entry will be made in the callback queue to call that customer at the specified date and time. Then, in step 510, the controller 11 proceeds, via an interactive voice and/or DTMF response process, to conduct the business or transaction for which the customer was contacted or called in.

If the customer's response at decision 526 is to update at that time then, in step 530, the customer's sensitivity profile will be played to the customer. The customer will be asked to approve or change each of the factors. Preferably, the presentation of and any necessary change to a factor will be accomplished via the above interactive process. Decision 532 determines whether a factor can be presented or any desired change accomplished easily and conveniently without the assistance of an agent. If the factor can be updated without the aid of an agent, then, in step 534, the factor is updated. If the factor cannot be easily and conveniently changed, such as a change of address, or if the customer requests to be connected to an agent, then, in step 508, the customer will be connected to an agent and an update screen, including any updates already provided by the customer, will be presented to the agent so that the agent can conduct and/or complete the update process. Once the update process is completed then, in step 510, the agent or the system controller 11 proceeds to conduct the business or transaction for which the customer was contacted or called in.

If the customer's response at decision 526 is not to update at that time then step 510 is executed next. In step 510, the controller 11 proceeds, via an interactive voice and/or DTMF response process, to conduct the business or transaction for which the customer was contacted or called in.

Figure 6A:
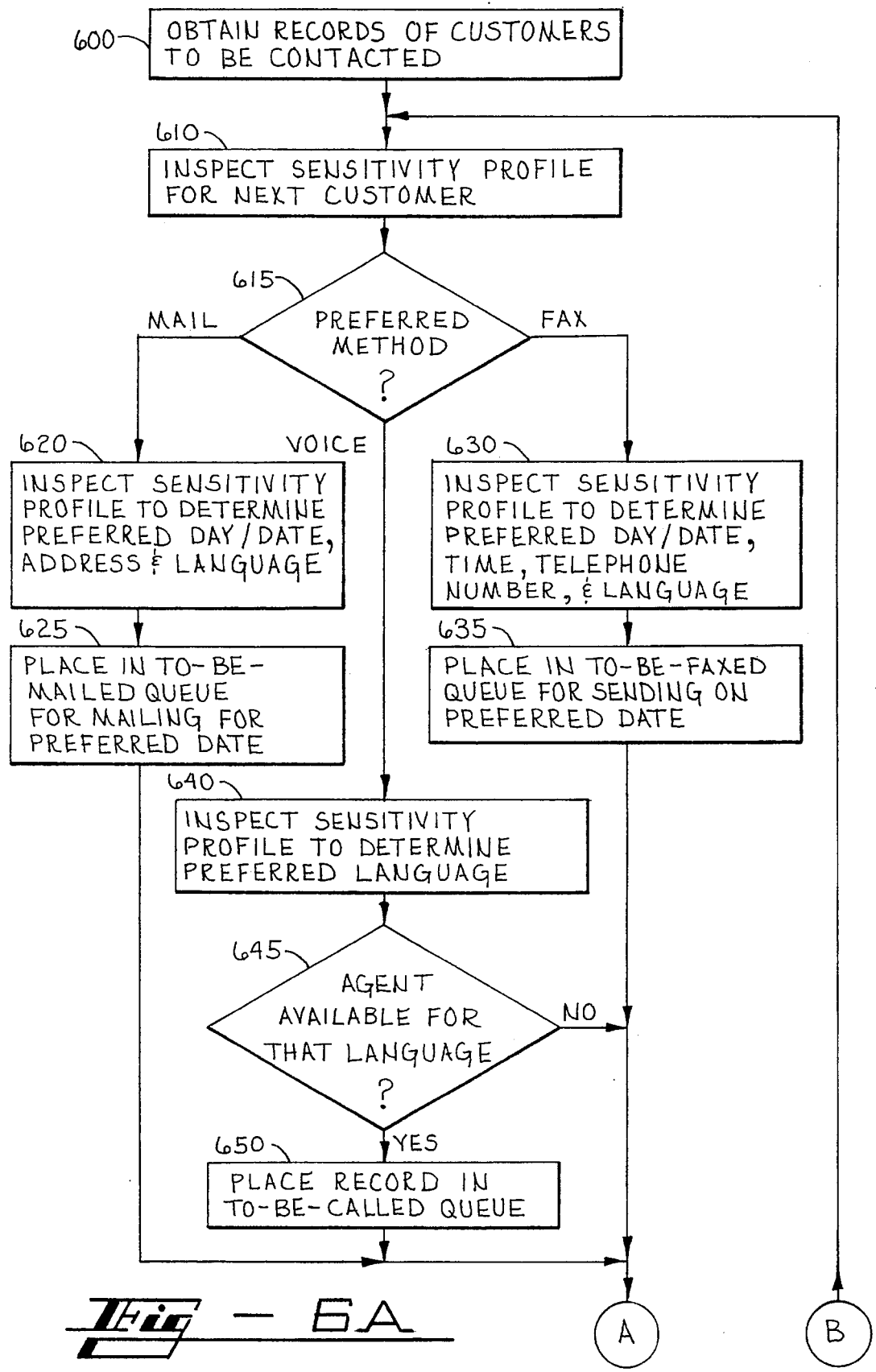
FIGS. 6A and 6B are a flow chart of the process of using and of updating a customer sensitivity profile.
Figure 6B:
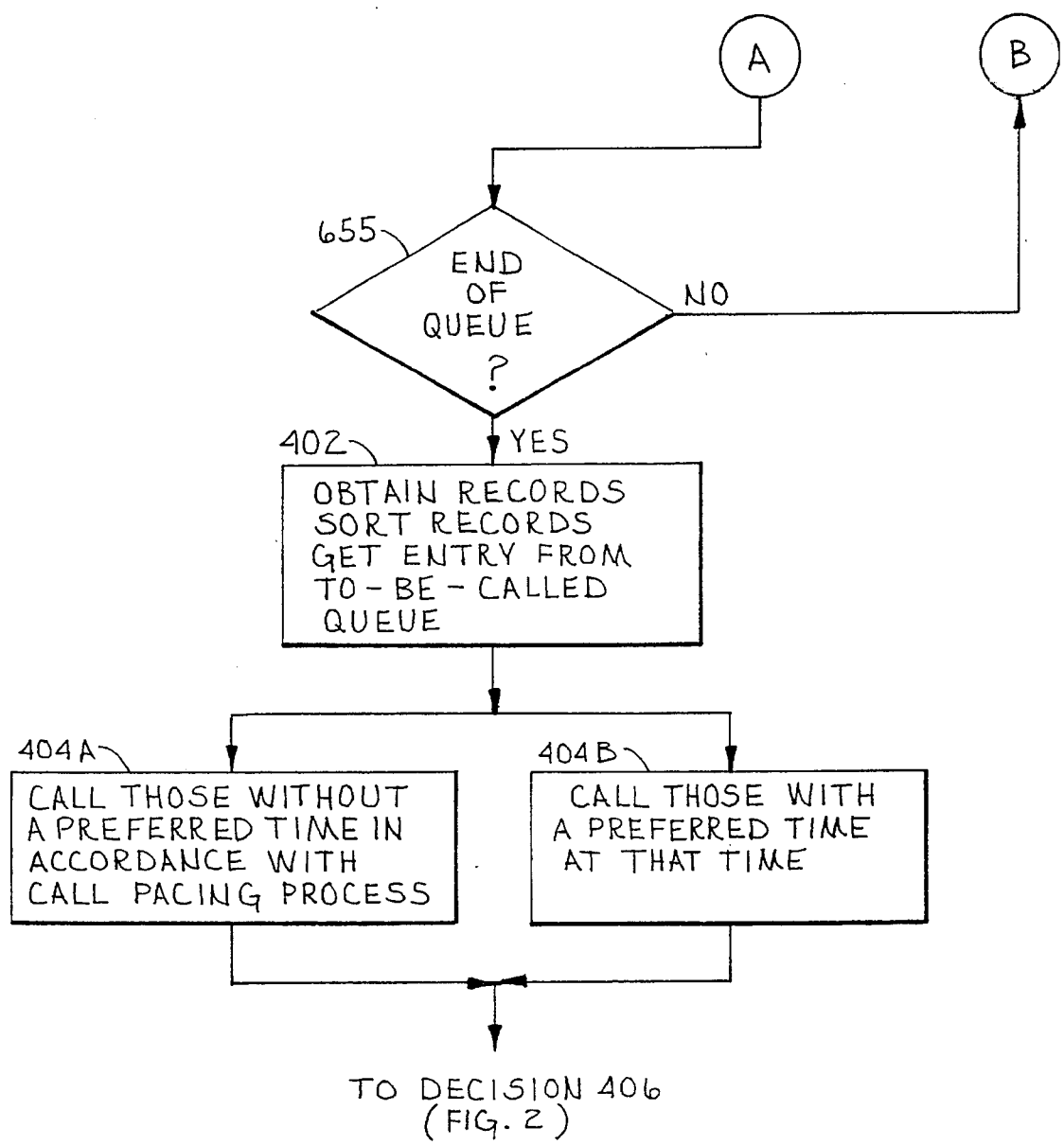

FIGS. 6A and 6B are a flow chart of the process of using and of updating a customer sensitivity profile. At step 600, the system controller 11 obtains from the host 10 the account records of the customers to be contacted with respect to updating of the customer sensitivity profile and/or the products, services, account balances, etc., offered by or of concern to the particular provider. This set of customers may be less than the entire customer base of the provider because the particular products, services, concerns, etc., may not be appropriate for all customers. Therefore, a sort process may already have occurred to identify those customers which are to be contacted and to create a list of those customers. This sort process includes identifying those customers who do not have a customer sensitivity profile, or who have an outdated customer sensitivity profile. This identification is performed by inspecting the customer records in the same manner as in decisions 506 and 522 above. In step 610, a customer record is obtained and the customer sensitivity profile is extracted for examination.

Decision 615 tests the preferred method of contact listed in the customer sensitivity profile. The examples listed are facsimile (fax), voice, and mail. However, other methods of contact are also possible, such as contact by electronic mail, by courier, etc. If the customer sensitivity profile indicates that mail is the preferred method of contact then, in step 620, the sensitivity profile is further examined to determine the preferred day or date of the month that the customer wishes to receive the correspondence, the address at which the customer wishes to receive the correspondence, and the language in which the customer wishes the correspondence to be written. Also, the profile will be examined to determine the products and/or services in which the customer has indicated an interest. Then, in step 625, this customer is placed in the mail queue so that the correspondence will be automatically generated, printed and mailed to the customer on the date specified, at the address specified, and in the language specified. The provider has therefore achieved its goal of contacting the customer. Further, the customer will generally be more receptive to this communication than to a communication from another provider because the customer has control over the communication method and has therefore received this communication on a date and in a manner deemed most convenient by the customer. Decision 655 is then executed.

At decision 615, if the profile indicates that fax is the preferred method of contact then, in step 630, the profile is further examined to determine the preferred time, day, and date of the month that the customer wishes to receive the correspondence, the telephone number(s) at which the customer wishes to receive the correspondence, and the language in which the customer wishes the correspondence to be written. Also, the profile will be examined to determine the products and/or services in which the customer has indicated an interest. Then, in step 635, this customer is placed in the fax queue so that the correspondence will be generated and sent by fax to the customer on the date specified, at the telephone number specified, and in the language specified. The seller has therefore achieved its goal of contacting the customer. Again, the customer will generally be more receptive to this communication than to a communication from another provider because the customer has control over the communication method and has received this communication, on a date and in a manner deemed most convenient by the customer. Decision 655 is then executed.

It will be appreciated that electronic mail is very similar in operation to facsimile in that both involve the transmission of data. Therefore, it should be understood that if the preferred method of communication is electronic mail then the steps involved will be the same as those for facsimile. However, for convenience of illustration, only the steps for facsimile transmission are shown. Also, even though facsimile server 18 and modem server 17 are shown as separate devices it will be appreciated that many devices perform both facsimile and modem functions.

It will be appreciated that facsimile communications and electronic mail communications are subject to some of the same problems as voice communications, that is, a busy number, no answer, an answering machine, an intercept signal, etc. Therefore, the queue control process described above can also be used to control the calling program for facsimile and electronic communications.

If, at decision 615, the profile indicates that voice is the preferred method of contact then, in step 640, the profile is further examined to determine the preferred language for communicating with the customer. Also, the profile will be examined to determine the products and/or services in which the customer has indicated an interest. Decision 645 determines whether an agent who speaks that language is available or is scheduled to be available later that day. To determine this it is necessary that each agent have an agent profile, which may be stored in either host 10 or controller 11, or both. The agent profile should indicate the language(s) spoken by the agent and the work schedule of the agent. If decision 645 determines that such an agent is neither available nor scheduled to be available then this communication should be deferred until such an agent becomes available. Therefore, decision 655 is executed next. Of course, one may wish to place a time limit on the deferral so that, even if an agent who speaks the preferred language is not available, the customer will still be placed in the to-be-called queue and contacted, even if not in the preferred language.

If decision 645 determines that such an agent is available or will become available during the course of the campaign then, in step 650, this customer is placed in the to-be-called queue with an indication of the time to place the call. Then, decision 655 is executed.

Once a customer has been placed in an appropriate queue, such as the mail queue, the fax queue, or the voice queue, then decision 655 will determine whether the end of the list has been reached, that is, whether all the records in the list already been examined. If the end of the list has been reached then step 402 below is executed. If the end of the list has not been reached then a return is made to step 610.

Step 402 is the same step 402 as in FIG. 4. The records have preferably already been obtained from the host 10 and sorted according to the preferred method of contact in decision 615. The list to be sorted now, according to the criteria selected by the system administrator, is the to-be-called queue. For example, the to-be-called queue is now sorted by area code, and those area codes in the eastern time zone may be called first. Step 402 further sorts the customers in the to-be-called queue according to the time and date specified in the customer sensitivity profile. This allows a call to be placed to certain customers at a time when one would not normally place a call to a customer. For example, one would not normally place a call to a customer at 11 p.m. However, the customer may work from 3 p.m. to 10 p.m. and has therefore indicated a preferred calling time of 11 p.m. Further, the customer may work a "swing" shift. That is, the customer works from 8 a.m. to 3 p.m. on the even numbered weeks of the year, and works from 3 p.m. to 10 p.m. on the odd numbered weeks of the year. Therefore, on even numbered weeks the preferred calling time would be 11 p.m., but on odd numbered weeks the preferred calling time would be 4 p.m. The sorting process therefore allows the call to be placed at the optimum time and date, as determined by the customer. After the to-be-called queue has been sorted as above, a customer record is obtained from the to-be-called queue. Then, a call is placed in one of steps 404A and 404B. Steps 404A and 404B indicate the preferred implementation of step 404 of FIG. 4. For a customer whose sensitivity profile does not indicate a preferred day or time of contact, in step 404A a call is placed to that customer in accordance with the call pacing process being used by the system controller 11. For a customer whose sensitivity profile does indicate a preferred day or time of contact, in step 404B, a call is placed to that customer at the indicated preferred day and time.

It will be noted that correspondence may have been sent to the customer as a result of decision 615. This correspondence may include a request for information to update or create the customer sensitivity profile for that customer. Preferably, the customer will respond and send in the requested information by mail, fax, electronic mail, or even by a telephone call. An agent, or even the provider, may then update the customer sensitivity profile for that customer. Therefore, the present invention provides for the automatic generation and maintenance of the customer sensitivity profile.

FIG. 7 is a flow chart of the agent assignment strategy process. This process is part of step 402 and is concerned with the assignment of agents to handle the goals of the various campaigns. In step 700 the requirements of a campaign are identified. This is accomplished by inspecting the customer sensitivity profile for each of the concurrent campaigns to identify specific requirements. Further, some campaigns may have specific requirements in addition to those requirements found in the customer sensitivity profile. These requirements are stored as part of the campaign programming and may be stored as part of the strategy script. Agent-specific requirements are those requirements, identified in the manner above, which are necessary to meet established campaign goals, or which the customer has indicated are important, or which the customer's record indicate are important. Examples of agent-specific requirements may be, for example: a particular language; a particular accent when speaking a language; a male voice or a female voice; a soft voice or a more forceful voice; a particular agent with whom the customer prefers to do business; an agent with strong debt collection experience; an agent with strong customer service experience; an agent with strong telemarketing experience; etc. Other campaign requirements may also be identified, such as the ability to use word processing equipment, the ability to use other office workstation tools (e.g., facsimile machines). Therefore, the examples provided above are not intended to be limiting.

The system administrator, when planning the strategy script, determines which requirements are to be inspected, and for which campaigns, in order to best match the goals of the campaign, regardless of whether those goals be, for example, to collect X dollars per agent, sell Y number of specific products or services, send Z letters/correspondence, etc. For example, the system administrator may decide that, for one high-priority campaign, all of the agents meeting a certain requirement are to be identified and assigned to that campaign. The system administrator may also decide that, for a given day, two campaigns have the highest priority for agents which meet certain requirements.

As each customer and each campaign may have specific requirements, each agent also has specific qualifications. Accordingly, an agent qualification profile is maintained for each agent. An agent qualification profile includes such factors as: the hours and days when the agent is scheduled to work; whether that agent is new, experienced, or somewhere in between; the speed with which that agent works; the success rate of that agent in selling certain types of products, services; etc. In addition, the agent qualification profile includes an indication as to whether an agent meets the agent-specific requirements discussed above. Therefore, the agent qualification profile includes complete information on the qualifications and abilities of the particular agent.

Once the agent-specific requirements are identified in step 700 then step 705 inspects the agent qualification profile for each agent to identify the agents who best meet campaign goal requirements.

Decision 710 determines whether, for a specific requirement, there are adequate agents available to handle the concurrent campaigns. This determination includes considering how many customers and agents have been identified, whether the calls for one campaign can be done after the calls for another campaign, whether the calls from one campaign can be interleaved with the calls for another campaign so that certain agents are switched continuously among two or more campaigns, the times specified for callback, or preferred times of calling in the customer sensitivity profile, etc. For example, if there is only one agent which meets the requirement, and the customer sensitivity profile indicates only a few calls are to be made at 11 am for one campaign, and the calls for the other campaign are to begin at or after 11 am, then there is no conflict because the few calls for the first campaign can be made first, or interleaved with the calls from the other campaign. If there are adequate agents to meet this requirement for all of the identified campaigns then there is no conflict and the agents are assigned to the identified campaigns. The assignment may be of all the identified agents, or of only a number or portion of these identified agents so as to leave some agents meeting this requirement for other, lesser priority campaigns. Decision 720 is then executed.

At decision 710, if it is determined that there are not adequate agents available to meet a particular requirement for all of the identified campaigns then, in step 715, the agents are assigned according to the strategy specified by the system administrator. For example, campaign A may be assigned such a high priority that agents are first assigned to meet the requirements of campaign A, and then any remaining agents are assigned to campaign B. Or, the agents may be assigned based upon a weighting factor or relative priority. For example, two agents are assigned to campaign A for every agent assigned to campaign B. Other conflict resolution procedures may also be specified by the system administrator as part of the strategy script. For example, campaign A may have the highest priority with respect to certain requirements and campaign B may have the highest priority with respect to other certain requirements. Once the conflict has been resolved and the agent(s) assigned then decision 720 is executed.

Decision 720 then determines whether all of the identified campaign goals and requirements have been met. If not then step 705 is repeated to identify the next level of agents who can meet the identified requirement(s). If all of the identified campaign goals and requirements have been met then the process ends at step 725. It should be appreciated that step 725 is merely the end of one cycle of the process. Each time that a change occurs, such as a campaign being started, or ended, or modified, or agents logging on or off, then the requirements and priorities may change. Accordingly, in the preferred embodiment, the process is repeated each time that a change occurs. In an alternative embodiment the process may not be repeated, or may be repeated only upon command from the system administrator, or may be repeated at specific intervals, or may be repeated at a specific time or times.

As shown above, the strategy script, in addition to controlling the operation of campaigns as described with respect to FIGS. 2 through 4 above, further controls the assignment of agents among the various campaigns. The present invention therefore provides for the automatic assignment of agents among the various campaigns in accordance with the identified requirements and business goals of the various campaigns and in accordance with the qualifications and abilities of each of the various agents.

Another aspect of the present invention is the automatic and proper assignment of resources (in addition to agent resources) to campaigns. This is also implemented by the strategy script and provides for allocation of the system resources, such as modems, facsimile machines, telephone lines, toll-free inbound telephone lines, the number, type and cost of telephone lines for local and long-distance outbound calling, etc. This allows the system administrator to devise a strategy script based upon the system resources and the campaign requirements. The strategy script determines these requirements and assigns the resources based upon the campaign requirements. For example, a campaign may require the use of modems to deliver electronic mail, but the intended recipients may all be in the local calling area. This allows other campaigns to use the facsimile machines and long distance lines. The strategy script also determines whether there are adequate resources to meet the requirements of concurrent campaigns. The strategy script also provides for assignment of the resources in accordance with a preplanned priority or procedure in the event that there are not adequate resources available. The assignment of resources is implemented in the same manner as the assignment of agents. FIG. 7 is therefore appropriate for the assignment of resources. It will, of course, be understood that a system resource profile is maintained, rather than agent profiles, and that the resources are matched with the campaign requirements. Conflicts between concurrent campaigns for system resources are also resolved on a campaign priority basis.

It will be appreciated from the above that the present invention is an automated customer service system and a method for operating same which is result-oriented, which monitors the success rate of a campaign, and which terminates the campaign, alters the campaign, and/or initiates other campaigns if the success rate of the campaign is not acceptable, or if the identified campaign goals have been achieved. This allows resources to be shifted to other campaigns which are waiting to start, or which are already in progress and which are having an acceptable success rate. It will also be appreciated from the above that the present invention is an automated customer service system which maintains and uses a customer sensitivity profile to contact the customer in a manner, at a time and date, and at a location which are preferred by the customer. This maximizes the likelihood that the customer will be favorably responsive to the contact, whether the contact is to make a sale, to discuss collection of a balance due, or just to obtain information about the customer. It will also be appreciated from the above that the present invention is an automated customer service system which maintains and uses an agent qualification profile, in conjunction with the customer sensitivity profile, to assign agents to the various campaigns in order to meet pre-established goals for each of the campaigns. From a reading of the description above of the preferred embodiment of the present invention, modifications and variations thereto may occur to those skilled in the art. Therefore, the scope of the present invention is to be limited only by the claims below.

I claim:

1. A method for contacting a customer, comprising the steps of:

obtaining a customer sensitivity profile for said customer, said customer sensitivity profile comprising the following factors: a preferred address for contacting said customer, a preferred telephone number for contacting said customer by voice, and a preferred manner of contacting said customer, said preferred manner comprising the following: by voice, and by means other than voice;

extracting said preferred manner from said customer sensitivity profile;

if said preferred manner is by voice then extracting said preferred telephone number from said customer sensitivity profile and automatically calling said customer at said preferred telephone number for voice; and if said preferred manner is by other than voice then automatically sending a document to said customer at said preferred address.

2. The method of claim 1 wherein said preferred manner further comprises at least one of the following: by conventional mail, by facsimile, and by electronic mail;

and wherein said customer sensitivity profile further comprises at least one of the following: a conventional mail address for contacting said customer by conventional mail, a preferred telephone number for contacting said customer by facsimile, and an electronic mail address for contacting said customer by electronic mail;

and wherein said method further comprises the steps of:

if said preferred manner is by conventional mail then extracting said conventional mail address from said customer sensitivity profile and automatically sending a document to said customer at said conventional mail address;

if said preferred manner is by facsimile then extracting said preferred telephone number for facsimile from said customer sensitivity profile and automatically sending a document to said customer at said preferred telephone number for facsimile; and if said preferred manner is by electronic mail then extracting said electronic mail address from said customer sensitivity profile and automatically sending a document to said customer at said electronic mail address.

3. The method of claim 2 and wherein said customer sensitivity profile further comprises a preferred time or date, or both, for contacting said customer by at least one of electronic mail and facsimile and, if said preferred manner is by electronic mail or by facsimile, then extracting said preferred time or date, or both, for said preferred manner from said customer sensitivity profile, and wherein said steps of sending a document to said customer comprise automatically sending said document at least in accordance with one of said preferred time and said preferred date.

4. The method of claim 1 wherein said customer sensitivity profile further comprises a preferred time or date, or both, for contacting said customer by voice, and wherein said step of calling said customer comprises automatically calling said customer at said preferred telephone number for voice at least in accordance with one of said preferred time and said preferred date.

5. The method of claim 1 wherein said customer sensitivity profile further comprises a date when said customer sensitivity profile was last updated, and further comprising the steps of:

determining whether a predetermined time has elapsed since said customer sensitivity profile was last updated; and if said predetermined time has elapsed then automatically contacting said customer to update said customer sensitivity profile.

6. The method of claim 5 wherein said step of contacting said customer comprises extracting said preferred manner from said customer sensitivity profile and automatically contacting said customer in accordance with said preferred manner.

7. The method of claim 5 wherein said step of contacting said customer comprises calling said customer at said preferred telephone number and automatically playing a message to said customer indicating that said customer sensitivity profile should be updated.

8. The method of claim 5 wherein said step of contacting said customer comprises calling said customer at said preferred telephone number and automatically playing a message to said customer asking when said customer would like to update said customer sensitivity profile.

9. The method of claim 8 and further comprising the steps of:

monitoring for a response from said customer to said message; and if said response is that said customer sensitivity profile should be updated at a later time, then playing a message prompting said customer to specify a time, a date, or both, for a repeat call to update said customer sensitivity profile, and automatically calling said customer to update said customer sensitivity profile on said time and date specified by said customer.

10. The method of claim 9 and further comprising the steps of:

if said response is that said customer sensitivity profile should be updated now, then automatically presenting a factor from said customer sensitivity factors to said customer.

11. The method of claim 10 and further comprising the steps of:

monitoring for a response from said customer to said factor; and if said response is that said factor is satisfactory, then automatically presenting a next factor to said customer.

12. The method of claim 10 and further comprising the steps of:

monitoring for a response from said customer to said factor;

if said response is that said factor is to be updated, then determining whether an update to said factor requires the assistance of an agent; and if said assistance is not required, then updating said factor.

13. The method of claim 12 and further comprising the steps of:

if said assistance is required, then automatically connecting said customer to an agent and displaying said factor to said agent.

14. The method of claim 1 wherein said customer sensitivity profile further comprises a date when said customer sensitivity profile was last updated, and further comprising the steps of:

determining whether a predetermined time has elapsed since said customer sensitivity profile was last updated;

if said predetermined time has elapsed then, when said customer places a telephone call to a predetermined number, automatically playing a message asking said customer to indicate whether said customer sensitivity profile should be updated.

15. The method of claim 14 and further comprising the steps of:

monitoring for a response from said customer to said message; and if said response is that said customer sensitivity profile should be updated, then automatically presenting a factor from said customer sensitivity factors to said customer.

16. The method of claim 15 and further comprising the steps of:

monitoring for a response from said customer to said factor; and if said response is that said factor is satisfactory, then automatically presenting a next factor to said customer.

17. The method of claim 15 and further comprising the steps of:

monitoring for a response from said customer to said factor;

if said response is that said factor is to be updated, then determining whether an update to said factor requires the assistance of an agent; and if said assistance is not required, then updating said factor.

18. The method of claim 17 and further comprising the steps of:

if said assistance is required, then automatically connecting said customer to an agent and displaying said factor to said agent.

19. The method of claim 1 wherein said customer sensitivity profile further comprises a date when said customer sensitivity profile was last updated, and further comprising the steps of:

determining whether a predetermined time has elapsed since said customer sensitivity profile was last updated;

if said predetermined time has elapsed then, when said customer is connected to an agent, automatically presenting a display to said agent to prompt said agent to inquire of said customer as to whether said customer sensitivity profile should be updated.

20. The method of claim 1 wherein said customer sensitivity profile further comprises a preferred contact requirement, and further comprising the steps of:

inspecting said customer sensitivity profile to determine said preferred contact requirement;

inspecting an agent qualification profile to determine if any agent on duty satisfies said preferred contact requirement; and if any agent on duty satisfies said preferred contact requirement, then automatically placing a call to said customer.

21. The method of claim 1 and wherein said customer sensitivity profile further comprises a preferred date for contacting said customer by mail and, if said preferred manner is by mail, then extracting said preferred date for mail from said customer sensitivity profile, and wherein said step of mailing said document comprises mailing said document on said date.

22. The method of claim 1 and wherein said customer sensitivity profile further comprises a preferred date for contacting said customer by conventional mail and, if said preferred manner is by conventional mail, then extracting said preferred date for mail from said customer sensitivity profile, and wherein said step of mailing said document comprises mailing said document by conventional mail to arrive by said date.

23. A method for contacting a customer, comprising the steps of:

establishing and storing a customer sensitivity profile having at least the following factors: a preferred manner of contacting said customer, a preferred time or date, or both, for contacting said customer, and information on how to contact said customer in accordance with said preferred manner, wherein said preferred manner comprises a preselected one of the following manners of contact: by facsimile, by electronic mail, and by voice;

automatically retrieving said customer sensitivity profile;

automatically extracting said factors from said customer sensitivity profile;

automatically initiating contact with said customer in accordance with said factors; and after conclusion of said contact with said customer, maintaining said customer sensitivity profile for use in initiating a next contact with said customer.

24. The method of claim 23 and, after said step of initiating said contact with said customer, further comprising the steps of:

presenting at least one of said factors from said customer sensitivity profile to said customer for approval or update;

monitoring for a response from said customer;

if said response is approval, then proceeding to said step of maintaining; and if said response is update, then updating said customer sensitivity profile.

25. The method of claim 24 and, if said preferred manner is by voice, then said information comprises a preferred telephone number for calling said party, said step of presenting comprises playing a message to said party, and said step of monitoring comprises detecting DTMF tones, and said method, after said step of monitoring for said response, further comprises the step of:

if said response indicates that the attention of an agent is required, then automatically connecting said customer to an agent and presenting at least said one factor of said customer sensitivity profile to said agent.

* * * * *